United States Patent
Ruskin et al.

(10) Patent No.: US 6,367,653 B1
(45) Date of Patent: Apr. 9, 2002

(54) CENTRALIZED MACHINE VENDING METHOD

(76) Inventors: Frank Ruskin, 225 W. 38th St., Los Angeles, CA (US) 90037; Anton K. Simson, 14530 Espola Rd.. Suite A, Poway, CA (US) 92064; Henri J. A. Charmasson, 2030 Sunset Blvd., San Diego, CA (US) 92103; John D. Buchaca, 4646 Judson Way, La Mesa, CA (US) 91941

( * ) Notice: Subject to any disclaimer, the term of this patent is extended or adjusted under 35 U.S.C. 154(b) by 0 days.

(21) Appl. No.: 09/666,038

(22) Filed: Sep. 20, 2000

Related U.S. Application Data

(63) Continuation-in-part of application No. 09/414,910, filed on Oct. 8, 1999, which is a continuation-in-part of application No. PCT/US98/08064, filed on Apr. 15, 1998, which is a continuation-in-part of application No. 08/844,767, filed on Apr. 22, 1997, now abandoned.
(60) Provisional application No. 60/104,006, filed on Oct. 13, 1998.

(51) Int. Cl.⁷ .............................................. B65G 59/00
(52) U.S. Cl. .......................................... 221/1; 221/197
(58) Field of Search .................................. 221/1, 6, 7, 9, 221/11, 17, 154, 197, 75, 232, 287

(56) References Cited

U.S. PATENT DOCUMENTS 5,647,507 A * 7/1997 Kasper ........................ 221/197
6,050,448 A * 4/2000 Willis .......................... 221/197

* cited by examiner

Primary Examiner—Kenneth W. Noland
(74) Attorney, Agent, or Firm—Henri J. A. Charmasson; John D. Buchaca

(57) ABSTRACT

A centralized method for selling items through a plurality of vending machines installed at various companies' sites comprises using vending machines having a substitutable goods-holding magazines from which goods can be extracted only when fully installed inside a vending machine and only by use of a special key when the magazines are outside their machines. The magazines are filled at the supply center and distributed along pre-established delivery routes. The servicing of each machine consists essentially of opening the machine, removing the previously installed magazine, substituting a new full magazine and securely locking the machine without any accounting of goods or currency or any other maintenance work.

11 Claims, 21 Drawing Sheets

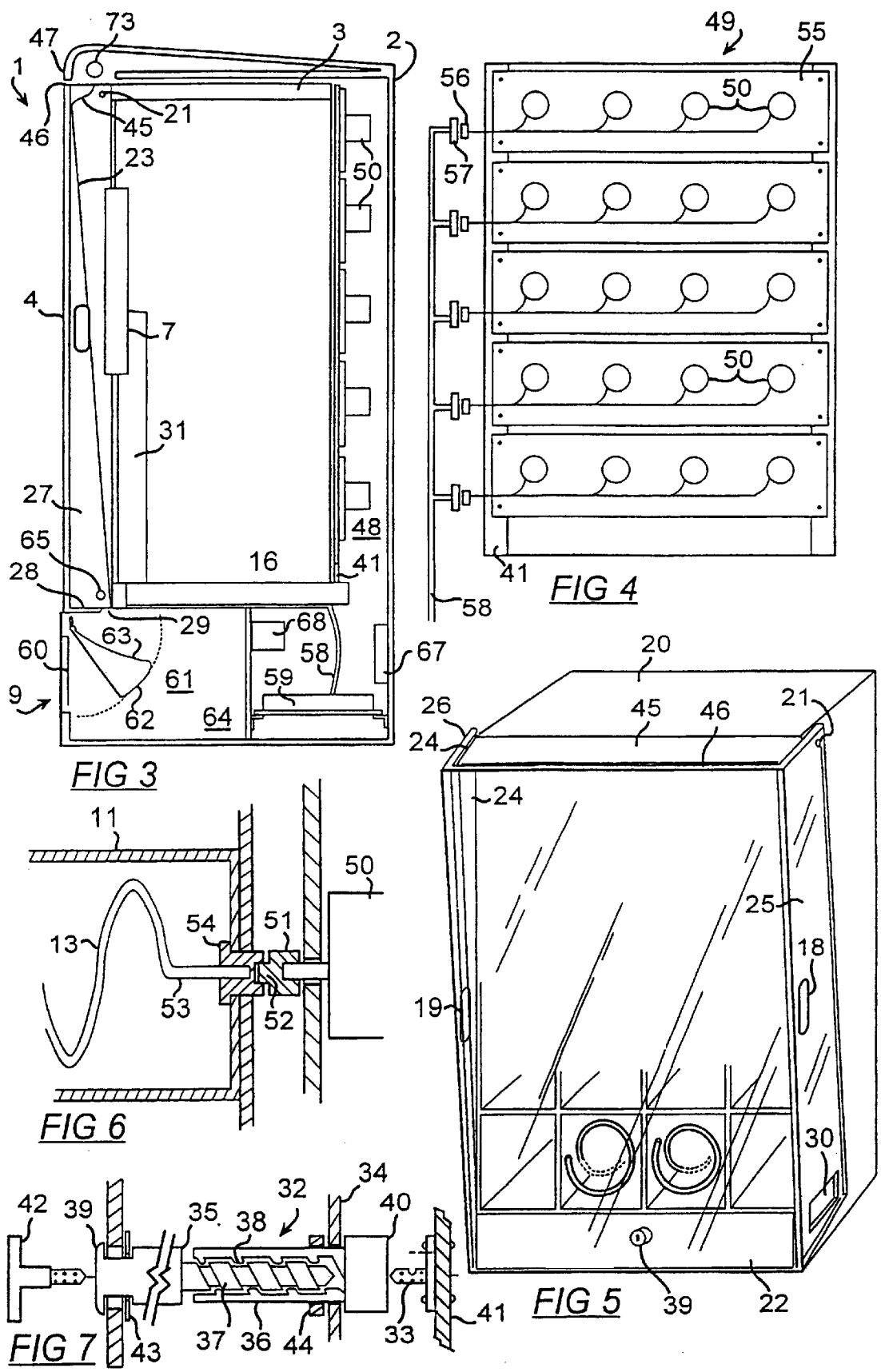

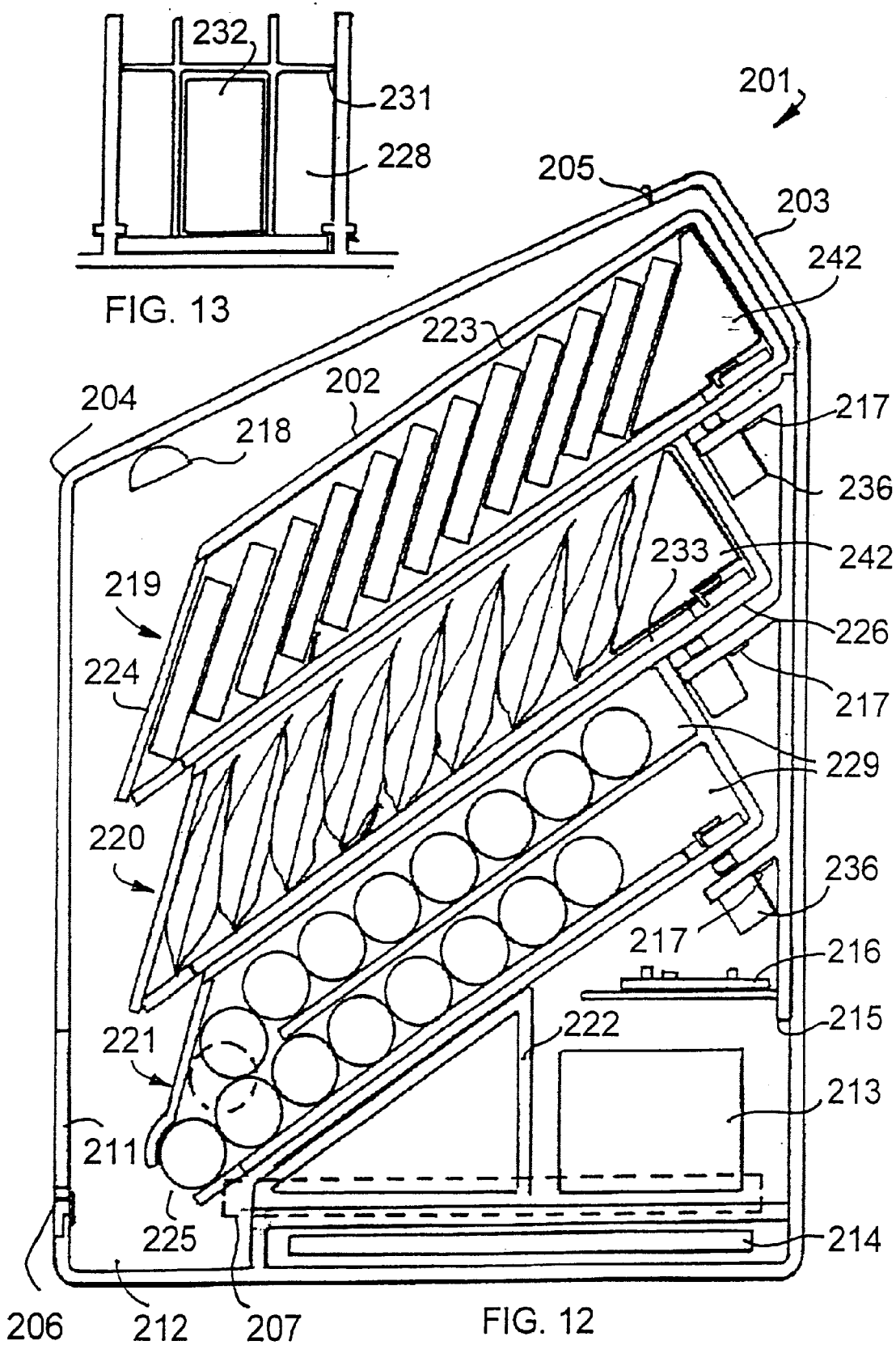

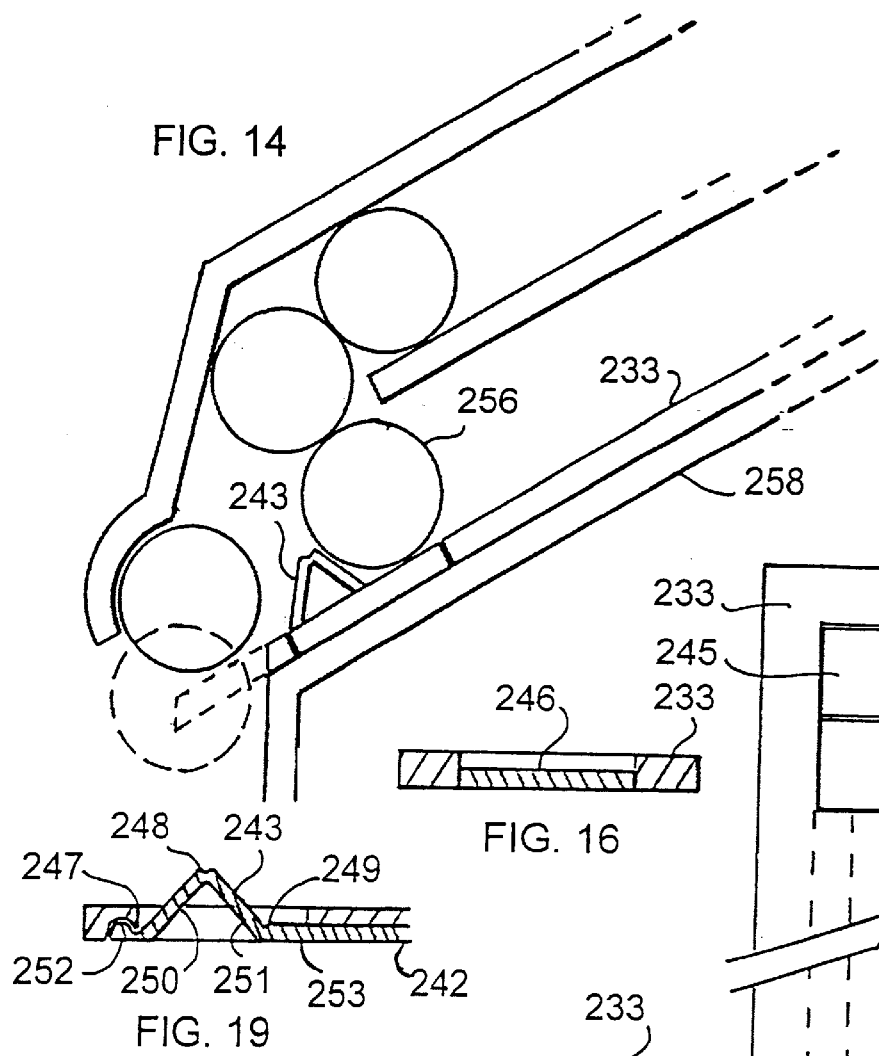

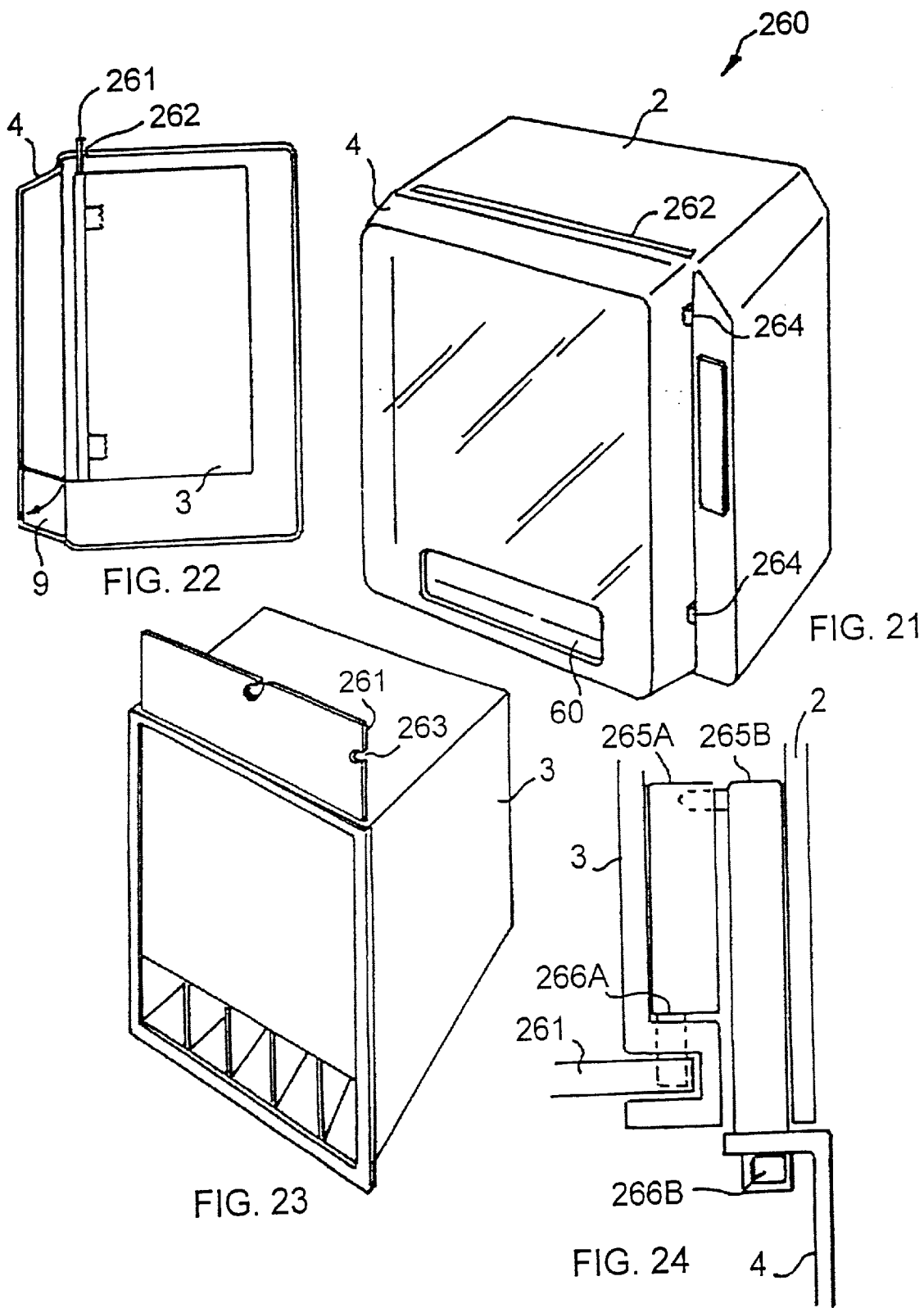

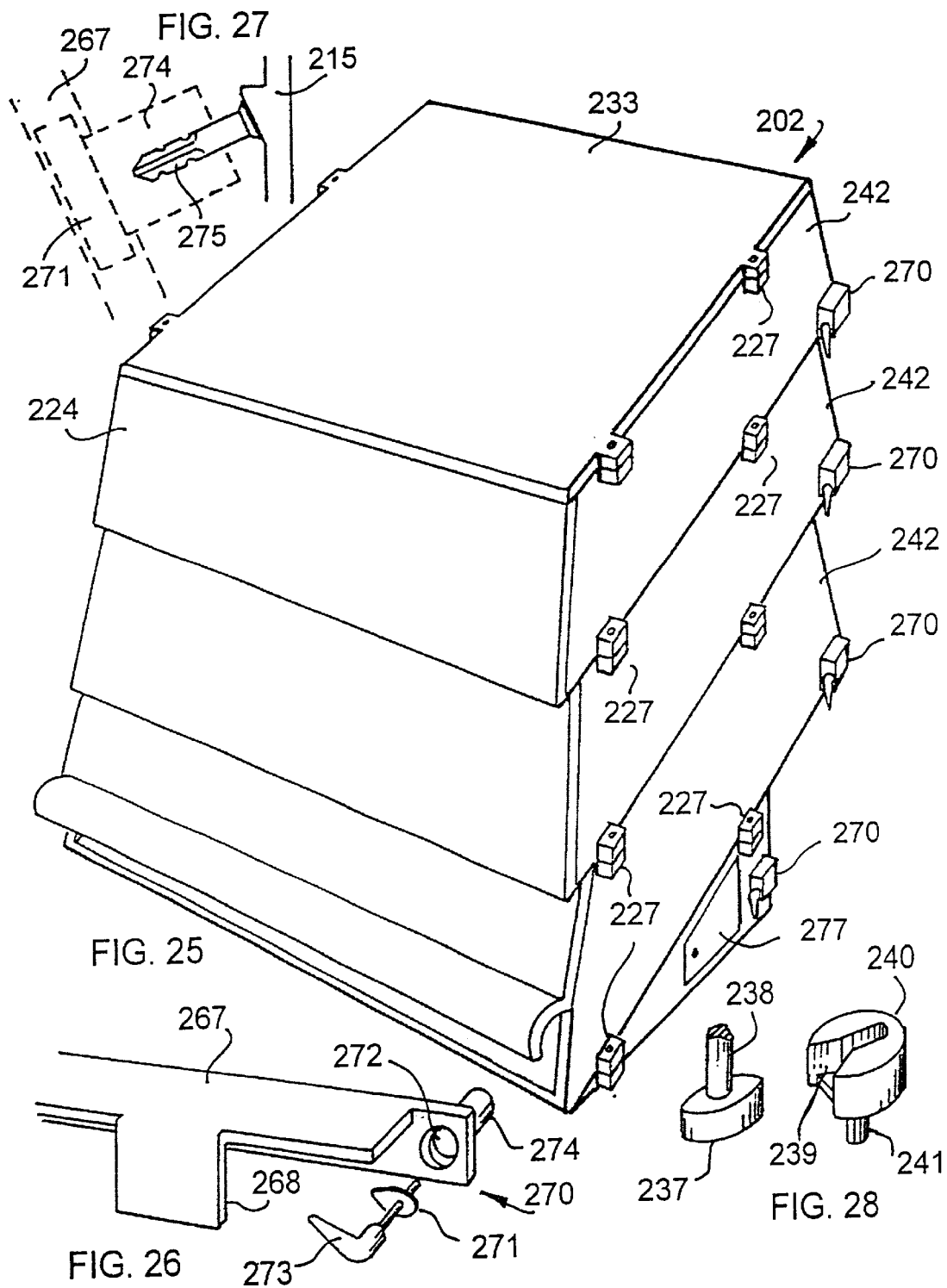

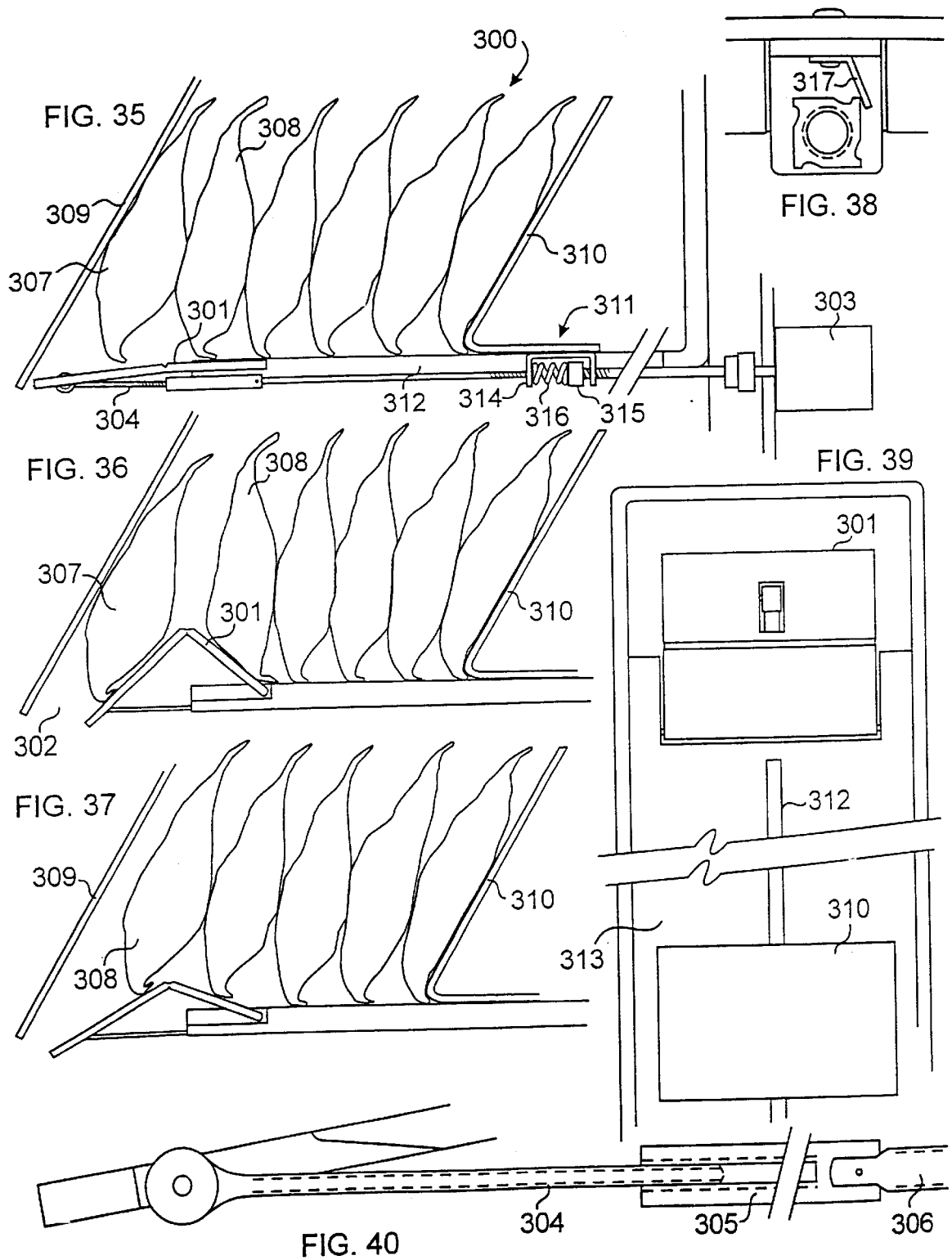

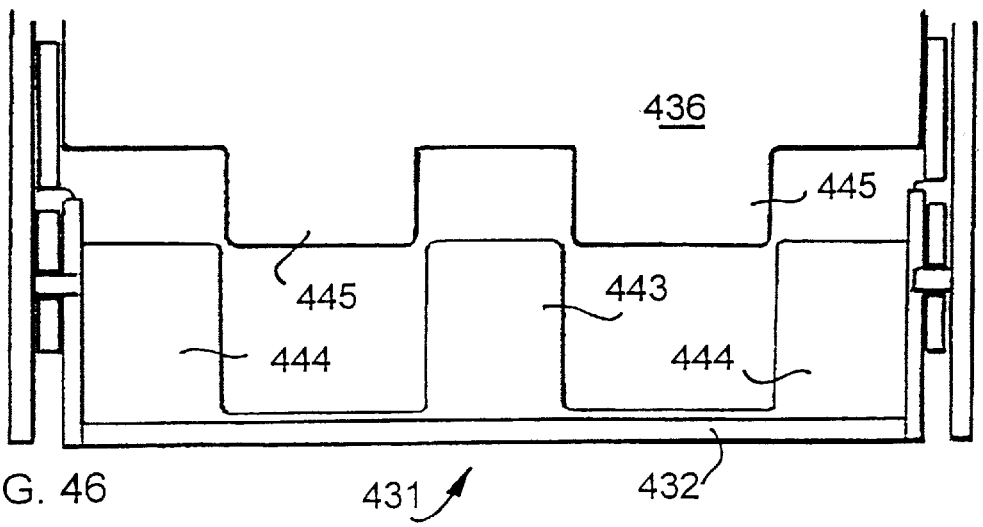
FIG. 46
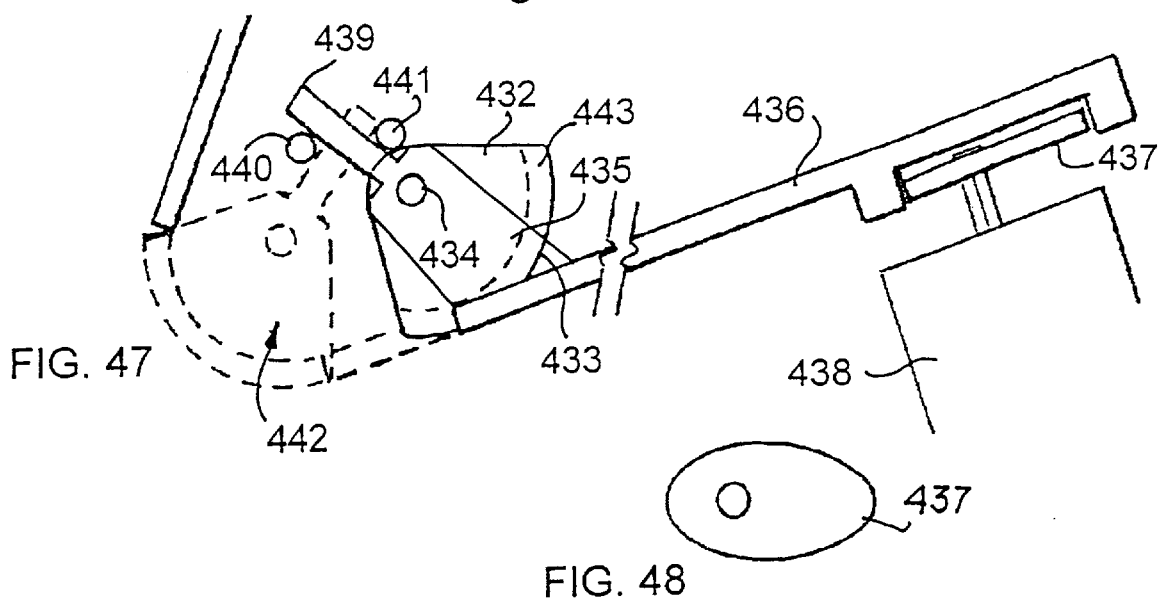
FIG. 47
FIG. 48

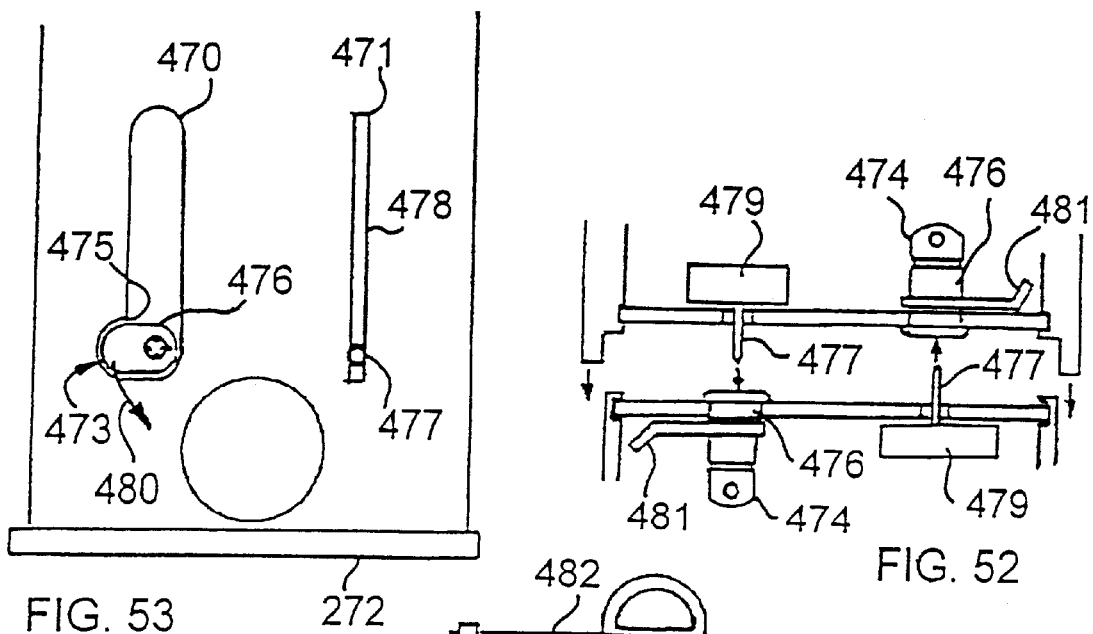
FIG. 53
FIG. 52
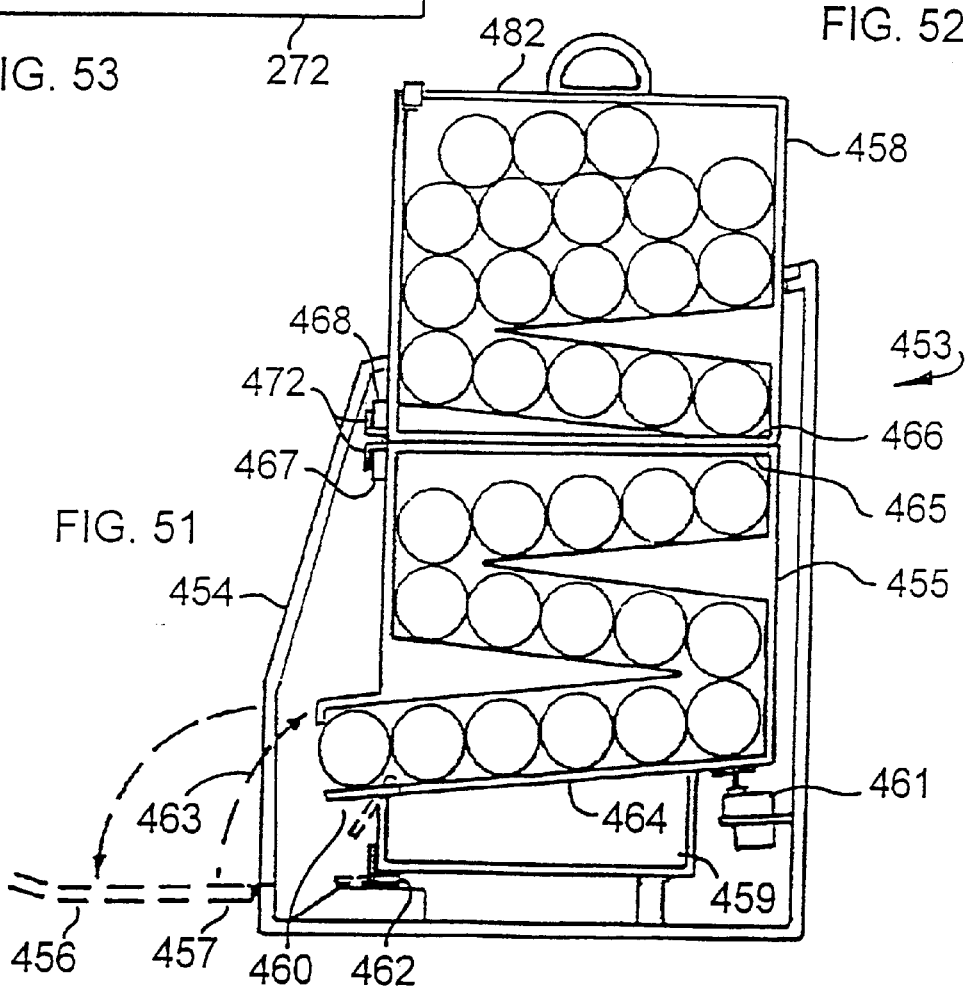
FIG. 51

CENTRALIZED MACHINE VENDING METHOD

PRIOR APPLICATION

This is a continuation-in-part of copending application Ser. No. 09/414,910 filed Oct. 8, 1999, a continuation-in-part of copending application Ser. No. PCT/US98/08,064 filed Apr. 15, 1998, a continuation-in-part application of Ser. No. 08/844,767 filed Apr. 22, 1997 and now abandoned. This is also a continuation-in-part of Provisional Application Ser. No. 60/104,006 filed Oct. 13, 1998.

FIELD OF THE INVENTION

This invention relates to vending machines, and more specifically to the type of vending machines found on jobsites capable of distributing pastries, small snack items and beverages.

BACKGROUND OF THE INVENTION

Conventional vending machines for pastries, candy bars, soda cans and other snack products must be able to hold a substantial inventory of goods so that they do not need to be serviced too often. Accordingly, they tend to be bulky and heavy and occupy about a square meter (10 square feet) of floor space, with a height of almost 2 meters (72 inches).

The reloading of such a machine is time consuming since items must be inserted one by one, and inventory of unsold items must be checked for expiration date, and, occasionally, replaced. Cash must then be collected and counted by the servicing employee. The good-holding stations must be cleaned of all oil and grease that may have oozed out of the packaged goods. These cumbersome procedures are time-consuming, labor intensive, and sometimes give occasion for pilferage and theft.

Conventional machines are not well-adapted to small job sites having 150 employees or less, because the profit generated at such a small site can not justify the labor cost of servicing the machines.

U.S. Pat. No. 4,236,649 Fellner et al. offers a partial solution to the above-mentioned problems by the use of a removable and replaceable magazine for the goods which can be loaded in the factory then used to replace an empty magazine or partially empty one. However, this type of magazine is relatively inefficient since it can hold only one item of goods in each location. Moreover, the coins need still be collected and counted on site. The same type of shortcomings characterize the vending machine disclosed in U.S. Pat. No. RE. 32,115 Lockwood et al. which uses a drum carousel to hold the goods to be sold. Although an empty carousel could be removed and replaced by a fully loaded one, each carousel station can only hold one item, and the cash must be handled separately. The inefficient designs of the above-devices inevitably leads to bulky vending machines which are not suitable for small locations.

The instant invention results from an attempt to palliate these various shortcomings.

SUMMARY OF THE INVENTION

The principal and secondary objects of this invention are to substantially reduce the time and expense involved in the refilling and maintenance of vending machines distributed at a plurality of locations over a given period, to reduce any losses due to pilferage of goods or conversion of payment currency by maintenance personnel, and reduce the health hazard occasioned by spillage of beverage and food items within the vending machines.

These and other valuable objects are achieved by the use of compact vending machines in which all the dispensable goods are held within a removable and substitutable magazine from which the goods cannot be extracted unless the magazine is installed within a locked vending machine or with the use of special key. Sets of magazines are filled in a central location then delivered to a plurality of vending machines along a predetermined route. At each location, the servicing of the machine consists essentially in opening the machine, removing the previously installed magazine, installing a fresh new magazine, securing the vending machine in the absence of any other maintenance, counting or inventory-taking of remaining goods, item by item or counting of any collected currency. Payments are made through debit cards sold by the vending machine operators to owners of locations for distribution to their employees and customers. Alternately, payments can be made by currency which once deposited into the machine are securely accumulated within the magazines and can only be retrieved at the central location with use of a special key. At certain locations, combinations of beverage and snack food item vending machines work together to deliver specially advertised combinations obtainable at a discount price. Magazines returned to the central location are emptied of any unsold goods and collected currency, cleaned, sanitized and refilled with fresh goods before being assigned to a route for distribution to a new location.

BRIEF DESCRIPTION OF THE DRAWING

FIG. 3 is a cross-sectional view taken along line 3—3 of FIG. 1;

FIG. 4 is a back elevational view of the motor-holding module assembly;

FIG. 5 is a perspective view of the magazine with the transparent door in the shipping position;

FIG. 6 is a detailed cross-sectional view of the sprial rack-motor coupling mechanism;

FIG. 7 is an exploded view of the lock assembly;

FIG. 12 is a cross-sectional view taken along line 2—2 of FIG. 1;

FIG. 13 is a cross-sectional view of a dispensing channel equipped with a good-centering insert;

FIG. 14 is a cross-sectional view of a can-dispensing mechanism;

FIG. 15 is a top plan view of a gating plate;

FIGS. 16, 17 and 18 are cross-sectional views taken along lines 6—6, 7—7, and 8—8 respectively of FIG. 15;

FIG. 19 is a detail cross-sectional view of a barrier mechanism;

FIG. 20 is a cross-sectional view of an alternate version of the dispensing channel;

FIG. 21 is a perspective view of a second alternate embodiment of a snack food dispensing machine;

FIG. 22 is a side cross-sectional fiew thereof;

FIG. 23 is a perspective view of the magazine;

FIG. 24 is a detail view of the locking mechanism;

FIG. 25 is a perspective view of a magazine;

FIG. 26 is a perspective exploded view of the cartridge locking mechanism;

FIG. 27 is a side view of a locking pin;

FIG. 28 is perspective view of a drive motor coupling mechanism;

FIG. 35 is a side view of an alternate goods dispensing mechanism;

FIG. 36 is a side view of the mechanism during the gate-opening sequence;

FIG. 37 is a side view of the mechanism during the gate-closing sequence;

FIG. 38 is a cross-sectional view of the pusher drive mechanism;

FIG. 39 is a top plan view of the alternate dispensing mechanism;

FIG. 40 is a detail view of the gate actuator;

FIG. 46 is a top plan view of an arcuate dispensing gate mechanism;

FIG. 47 is a side view thereof;

FIG. 48 is a top plan view of an actuating cam;

FIG. 51 is a side view of a beverage can dispensing mechanism and auxiliary magazine;

FIG. 52 is a front view of the magazine interlocking mechanism;

FIG. 53 is top plan view of a magazine gate;

DESCRIPTION OF THE PREFERRED EMBODIMENT OF THE INVENTION

Figure 1:
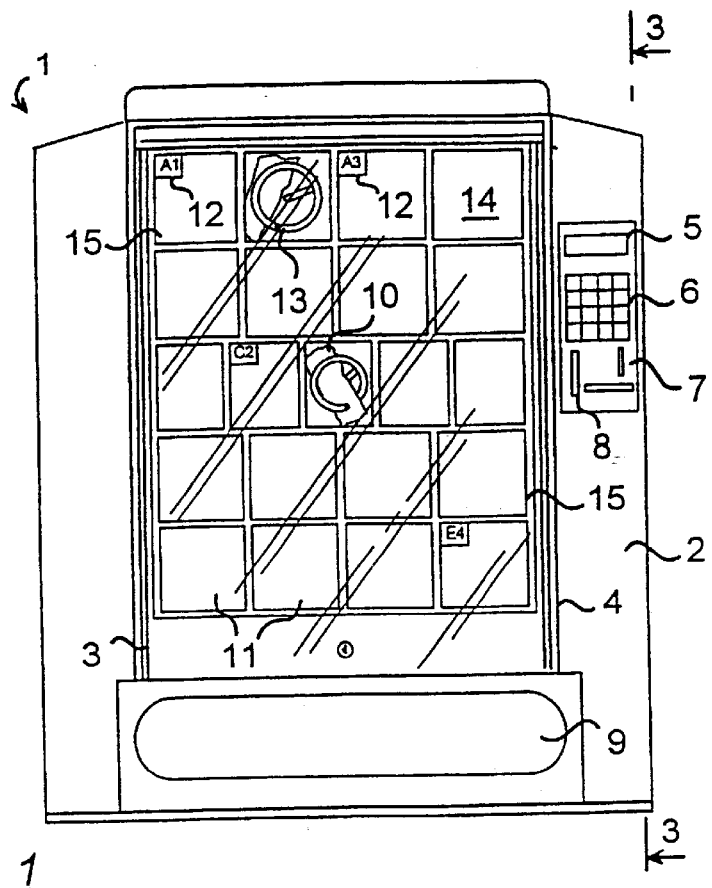
FIG. 1 is a front elevational view of the vending machine.

Referring now to the drawing, there is shown a compact, counter top vending machine 1 housed in a molded plastic and sheet metal cabinet 2. A substitutable, quadrangular magazine 3 having a transparent front door 4 is securely held into the cabinet. The customer interface includes a message display 5, a keypad 6 upon which the selection of a desired goods can be made, a currency-acceptor 7, a magnetic-card reader 8 and a dispensing pocket 9. The goods 10 and the numbers of the stations or cells 11 holding them can be observed through the transparent door of the magazine.

Each station 11 can hold a plurality of goods having the same sale price. Each station is identified by a letter (A–E) and a number (1–5) designating a column of stations. In each station 11, a plurality of goods are held between the coils of a spiral rack 13. These goods may be of various configurations or sizes. When a spiral rack is rotated, it acts as an Archimedes screw, and shifts the goods toward the access port 14 along the front of the magazine. The magazine comprises five layers of good-holding station units or trays 15. It should be understood that the number of stations in each unit and the number of units in a magazine can be varied to accommodate different sizes and varieties of goods. Typically, small goods such as candy bars can be loaded on a five-station unit such as the one shown in the third row. Large items such as pastries and potato chip packs that require a larger station, can be loaded on units having four stations such as the one shown in the first, second, fourth and fifth rows.

Figure 2:
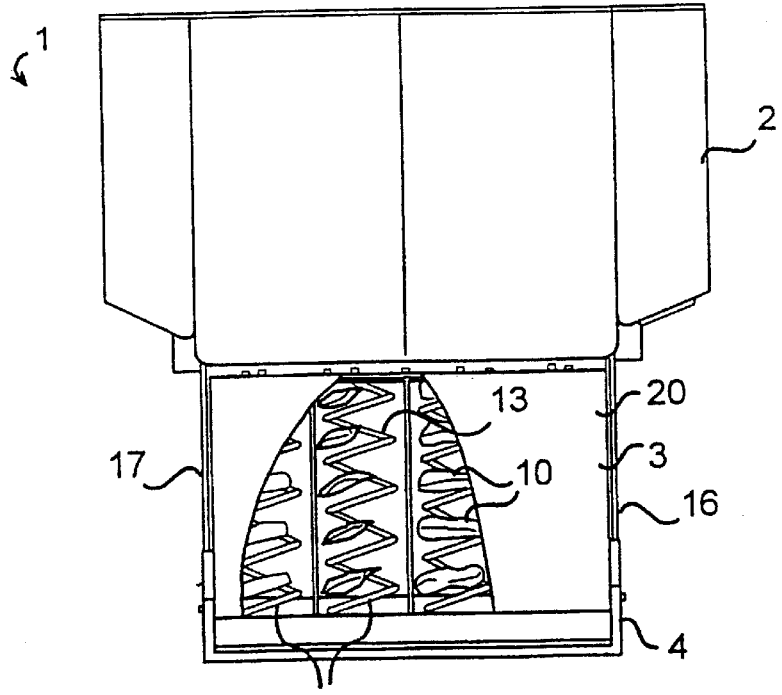
FIG. 2 is a top plan view thereof with the magazine withdrawn for removal.

The lower, lateral corner of the magazine 3 rests upon a pair of fully extendible drawer slides 16, 17 for ease of installation and removal as illustrated in FIG. 2. Elongated, shallow depressions 18, 19 in the sides of the transparent door 4 form convenient pulling handles.

As more specifically illustrated in FIGS. 3 and 5, the magazine 3 comprises a quadrangular box housing 20 in which the transparent door 4 is hinged by a set of pins 21 along the upper frontal edge. The lower part of the box is occupied by a currency receptacle 22. The front, lateral edges 23, 24 of the box 20 are slightly slanted downwardly and inwardly. The transparent door 4 has two pairs of lateral flanges 25, 26 that overlap by approximately 9 centimeters (3.5 inches) the sides of the box. Accordingly, when the door 4 is held in a vertical position as shown in FIG. 3, there is created a void space 27 between the access ports 14 of the station and the back face of the transparent door. Moreover, because of the slanted edges 23, 24 of the cabinet, there remains an open gap 28 between the lower edges of the box and the transparent door. This gap matches an opening 29 on the front top part of the dispensing pocket 9. The void 27 and the gap 28 provide a chute for the goods ejected by the spiral racks out of their respective stations.

When the magazine is installed in the cabinet, and the transparent door is kept in the above-described vertical position, a slot opening 30 in the right side of the coin receptacle is not covered by the right flange 25, and is lined up with the base of a currency chute 31 which drops down from the currency-acceptor. However, when the magazine is extracted from the cabinet, the transparent door is slanted inwardly as more specifically illustrated in FIG. 5. In that position, the right flange of the door 24 completely seals the slot opening 30. A locking mechanism 32 is attached to a central, lower section of the transparent door 4 and passing through the currency box 22 cooperates with a keyed-pin 33 mounted on the back frame 41 of the cabinet.

The locking mechanism 32 comprises two telescopically engaged members 35, 36 which are axially adjustable through the cooperative action of their male 37 and female 38 threads. At the distal end of each member is a lock 39, 40.

The locks act as clutches, whereby in the unlocked position, the threaded members 35, 36 are free-spinning in relation to the locks, and in the locked position, the male threaded member 35 can be rotated by means of a key 32 providing that the keyed pin 33 is engaged into the inner lock 40. Furthermore, once the cooperating members 35, 36 have been extended by a counter-clockwise movement of the key 42, the inner lock 40 cannot be separated from the keyed pin 33. The outer lock 39 is rotatively and permanently secured to the transparent door 4 by a washer 43. The inner lock 40 prevents the female-threaded member 36 from escaping from a pass-through hole in the back wall 34 of the magazine. The front lock is long enough to span most of the depth of the currency box receptacle 22. The inner lock 40 is rotatively attached to the back panel 34 of the magazine box 20 by a nut 44. Accordingly, it can be understood that the transparent door 4 of the magazine can only be placed in the vertical position illustrated in FIG. 3 when the magazine is fully inserted into the cabinet 2. In that position, the magazine is safely locked into the cabinet by the attachment of the inner lock 40 to the keyed pin 33. In order to remove the magazine from the cabinet, the service key 42 must be used to turn the male thread member 35 clockwise, thus pushing the transparent door's lower edge toward the lower edge of the currency receptacle, and effectively closing the slot opening 30 on the side of the currency receptacle. Once the magazine has been thus secured, the locking of the keyed pin 33 with the inner lock 40 is released and the magazine can be pulled out of the cabinet. It should be noted that the overhang 45 along the upper edge of the box effectively prevents access to the station when the cabinet magazine is out of the cabinet. It should also be noted that when the magazine is inserted into the cabinet, the top edge 46 of the transparent door 4 abuts the upper edge or lintel 47 of the cabinet. Accordingly, the transparent door cannot be pulled back further than the vertical position shown in FIG. 3. In a warehouse or service center, a special key similar to the keyed pin 33 is used to disengage the two threaded members 35, 36 in order to completely open the door 4 to give access to the stations.

In an alternate construction of the magazine, the box 20 is omitted. The station units or trays 15 are simply stacked upon one another and held together by self-aligning bolting pins to form the magazine.

In the back section of the cabinet, and for each row of good-holding stations, there is a good-extracting mechanism 49 that is engineered and positioned to contact the spiral rack of the good-holding units. As shown in FIGS. 4 and 6, each goods-extracting mechanism comprises an electrical motor 50 coupled to a short spline 51 having at its distal end, a head 52 shaped and dimensioned to couple with the spiral rack mechanism of a good-holding station when the magazine is fully inserted into the cabinet. The shaft 53 of each spiral rack 13 is held in a bearing 54 that is mounted in the back plane of a station unit, and passes through a hole in the back plane 40 of the magazine box 3 where it comes into engagement with the spline head 52 of a corresponding motor 50. Gangs of motors are mounted on motor-holding modules 55 secured to the back-mounting frame 41. There is one motor-holding module for each station unit. The wirings of the motors in each module are brought to a pigtail connector 56 that mates with a corresponding connector 57 on the main wiring harness 58 leading to the electronic control unit 59 located in the rear of the cabinet base. Accordingly, modules of four or five motors can be quickly substituted for one another to match the composition of the station units.

The goods dispensing pocket 9 comprises an opening 60 leading to a opens space 61 immediately below the front end of the magazine. The opening 60 is closed by a triangular trapdoor hinged just above and behind the upper edge of the opening. Goods escaping from one of the spiral racks fall down the chute 27 into the dispensing pocket 9 where they can be retrieved by pushing the trapdoor 62. It should be noted that the curved back 63 of the trapdoor tends to direct the goods toward the back end of the open space 61 where they do not interfere with the movement of the trapdoor. It should also be noted that when the trapdoor is pushed, it prevents access to the station by effectively closing the opening 29 in the roof of the dispensing pocket.

An electronic sensor 65 mounted near that opening detects the passage of the goods toward the distributing pocket. The output of the sensor is fed to the microprocessor 66 which constitutes the principal component of the electronic control unit 59. The microprocessor typically includes a storage memory or equivalent recording medium. A fan 67 proximate the electronic control unit 59 is used to extract heat out of the cabinet. An infrared transceiver 68 provides access to the micro-processor data. This transceiver may be used by a service person to read useful information such as money paid, and goods sold using a type of hand-held downloading device well known to persons skilled in the art of data-processing, and provide a communication interface with various types of devices and networks according to so-called "Bluetooth" technology.

It can now be understood that once a user has made a selection by dialing on the keypad 6 the identification of the station holding the desired type of goods, the good-extracting mechanism servicing that particular station can then be activated to cause the goods most frontally located on the spiral rack to fall through the chute 27 into the dispensing pocket 9.

Figure 8:
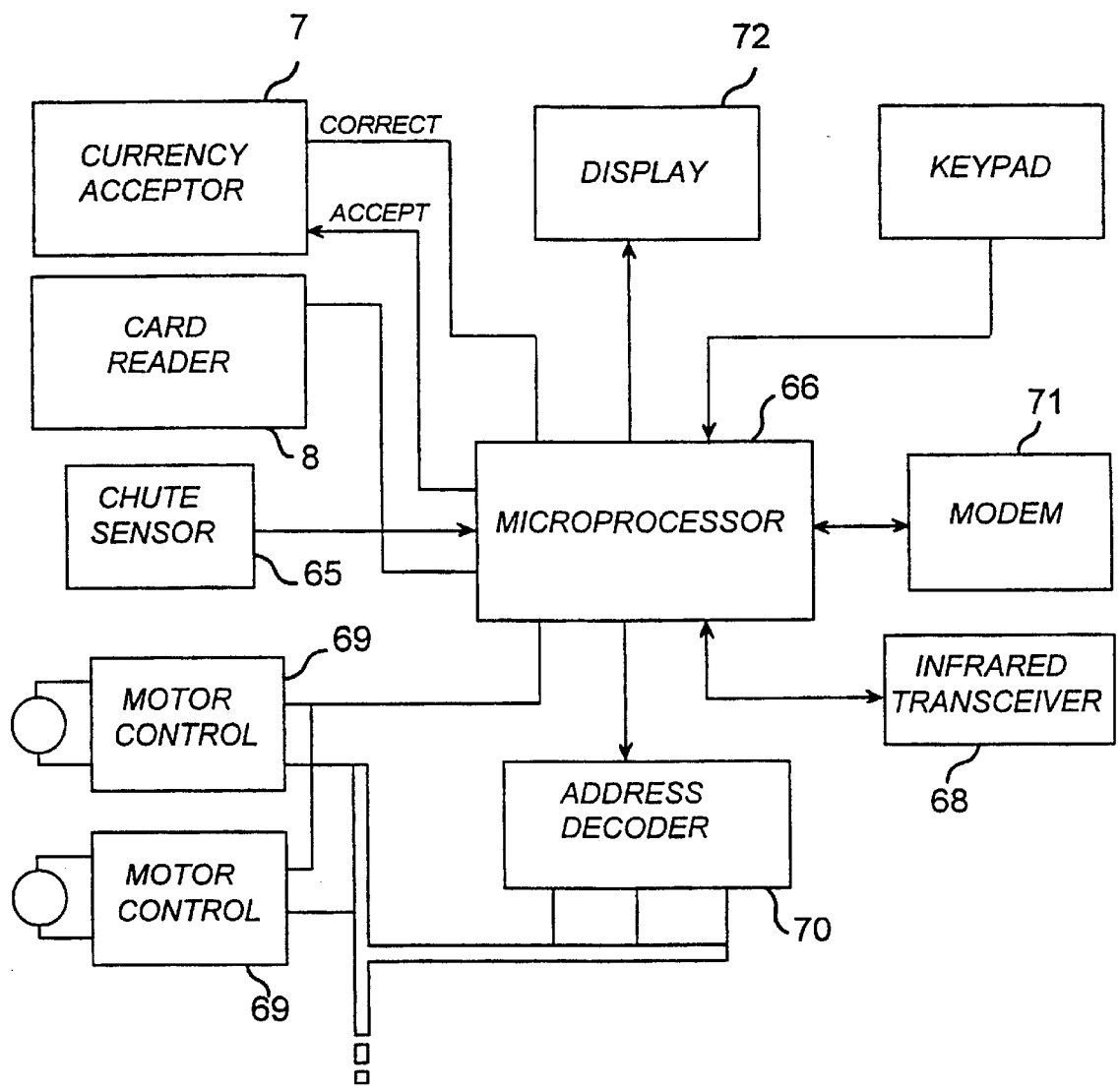
FIG. 8 is a block diagram of the electronic units.
Figure 9:
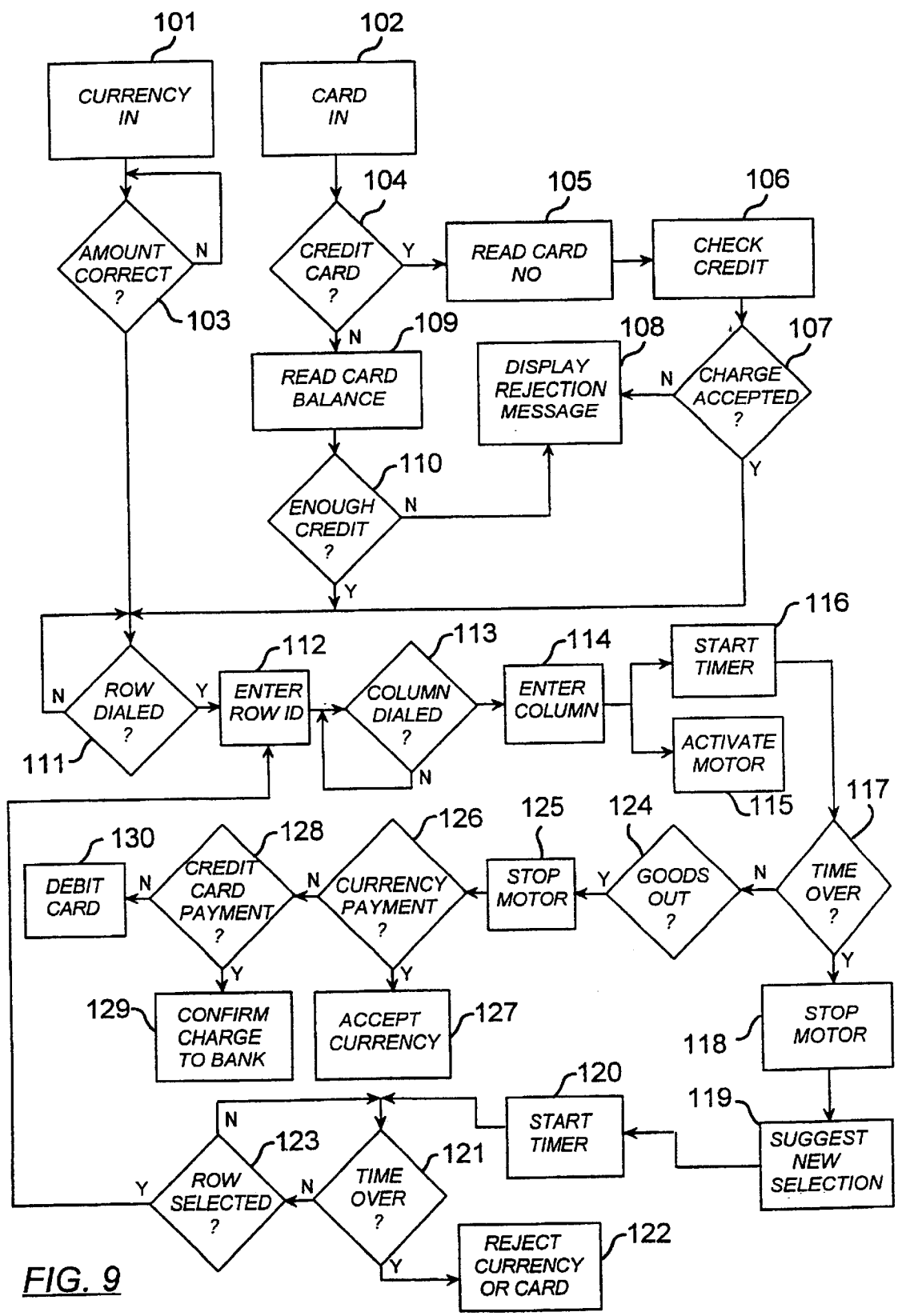
FIG. 9 is a flow diagram of the machine operation.

As shown in FIGS. 8 and 9, the operation of the vending machine is controlled by the microprocessor 66. The motors are controlled by motor-control modules 69, and the address-decoder 70. The motor-control modules and the address decoder consist essentially of gated current drivers, that, under control of the microprocessor, feed the forward current to the two appropriate motor. A modem 71 provides the communication interface to the microprocessor via conventional phone carrier services and/or via the Internet. An LCD message display 72 which is part of display 5 on the front of the cabinet is used to suggest to the user an alternate selection when the selected items is not available and to give other notices as will be explained below. A light 73 is mounted in the front portion of the cabinet to illuminate the front opening of the stations.

As more specifically illustrated in FIG. 9, the operation of the machine begins when the currency-acceptor detects that currency has been entered 101, when a magnetic card has been inserted 102 or when an alternate form of payment such as an electronic transfer through the Internet, or out of a palm-held cash register. In case of payment by currency, once the correct amount has been received 103, the system waits for the user to dial his choice of goods beginning with the letter corresponding to the proper row. In the case of a payment by magnetic card, the system first determines whether it is a credit card 104. In that case, the card owner's identification is read 105, and a credit check is initiated 106 via the modem 71. If credit is refused, the user is so advised by the display 108 of a rejection message. If the credit card owner has sufficient credit, the system waits for the user's selection. If the card is not a credit card, the system assumes that it is a debit, or so-called "smart card", and reads the card for the available balance 109. If the balance is not sufficient to pay for one of the offered goods, a rejection message is displayed 108. If that balance is sufficient to cover a purchase 110, the system waits for the user's selections.

Once the user has selected a row 111, that row identification is entered 112 into the microprocessor. The system then waits for the dialing of the appropriate column 113. When the column is dialed, its identification is entered into the computer 114. At that point, the corresponding motor is started 115 and, at the same time, a ten-second timer is also started 116. If the timer expires 117 before the electronic sensor 65 detects the passage of goods into the dispensing pocket, the motor is stopped 118 and a message suggesting an alternate selection 119 is displayed. A twenty second timer is also started 120. If that timer runs out 121 before a new row letter is dialed by the user, the magnetic card or the currency which has been introduced into the machine, is rejected 122. If a row letter is dialed before the expiration of the timer 123, the system proceeds with the entering of the row identification 112; then the column identification 114 as previously described. If the electronic sensor 65 detects the passage of the goods 124 before the ten-second timer runs out, the motor is stopped 125. In the event of payment by currency 126, the currency is accepted 127 and dropped into the currency receptacle 22. In case of payment by credit card 128, the charge is confirmed to the bank 129 via the modem 71. In case of payment by "smart card", the card is debited 130 by the price of the goods.

As disclosed in U.S. Pat. No. RE. 32,115 Lockwood et al. which patent is incorporated in this specification by this reference, the modem 71 can be used to communicate with a warehouse or other type of control center, in order to provide information about the status of the vending machine such as the amount of goods already sold, proceeds received including the exact amount of currency which is now stored in the currency receptacle 22. The microprocessor can be programmed according to well-known techniques to initiate that kind of communication at preset intervals or specific times through a conventional phone network or via the Internet. The machine activity and sale data that is compiled by, and stored by the microprocessor can be downloaded on site by the service personnel on a recording medium that is returned to the central location along with the expanded magazine. Alternately, the microprocessor can respond to polling calls initiated from the control center. From the information thus received at the control center, the most appropriate time when servicing personnel should be dispatched to exchange the magazine of the machine can be determined. Moreover, the amount of money held in the currency receptacle, as well as the amount of goods remaining in the magazine are already known and can be verified upon receipt of the magazine. Any tampering or pilfering by the service personnel can thus be abated.

The preferred embodiment of the vending machine has a total height of 99 centimeters (39 inches), a total width of 84 centimeters (33 inches), and a total depth of 51 centimeters (20 inches), and an approximate weight of 36 kilograms (80 pounds), including an empty magazine. Such a vending machine can be easily transported and installed on a table or counter top where it occupies no more than 0.5 square meters (5.4 square feet).

In order to minimize the manufacturing, reconfiguring and maintenance of the vending machine, a combination of modular molded plastic and stamped metal components are used. The back and bottom part of the cabinet constitutes a single metal-stamped assembly. The back mounting frame 41 and the motor-holding modules are also made of metal-stampings. The cabinet consists of two symmetrical and similar molded plastic half-shells joined in the middle of the cabinet. The transparent door and the magazine itself are also made of molded plastic.

The use and profitability of the vending machine can be substantially increased by combining it with a programmable scrolling display of the type disclosed in U.S. Pat. No. 5,493,802 Simson, which patent is hereby incorporated in this specification by this reference.

Figure 10:
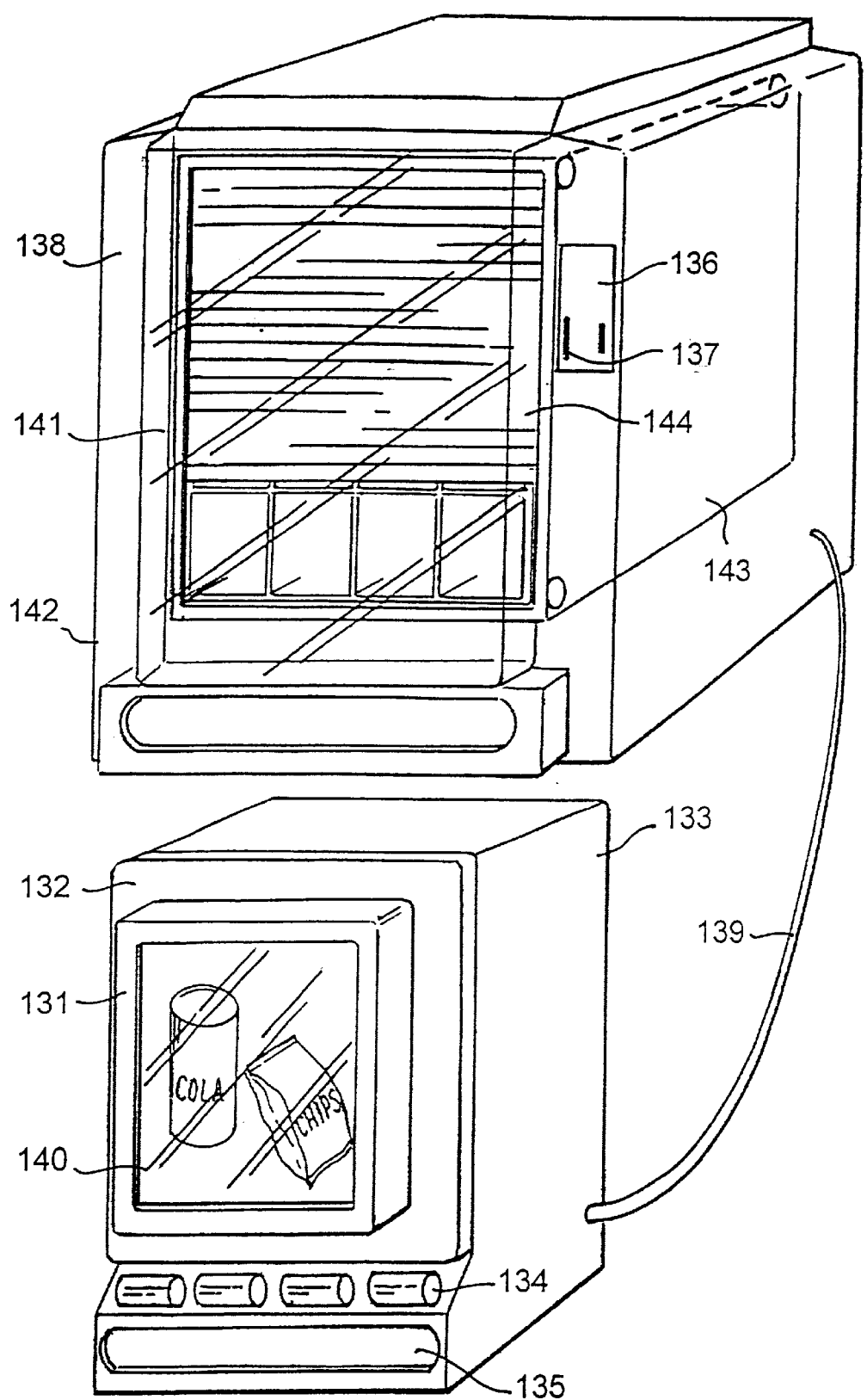
FIG. 10 is a perspective view of a multi-unit machine equipped with a scrolling display.
Figure 11:
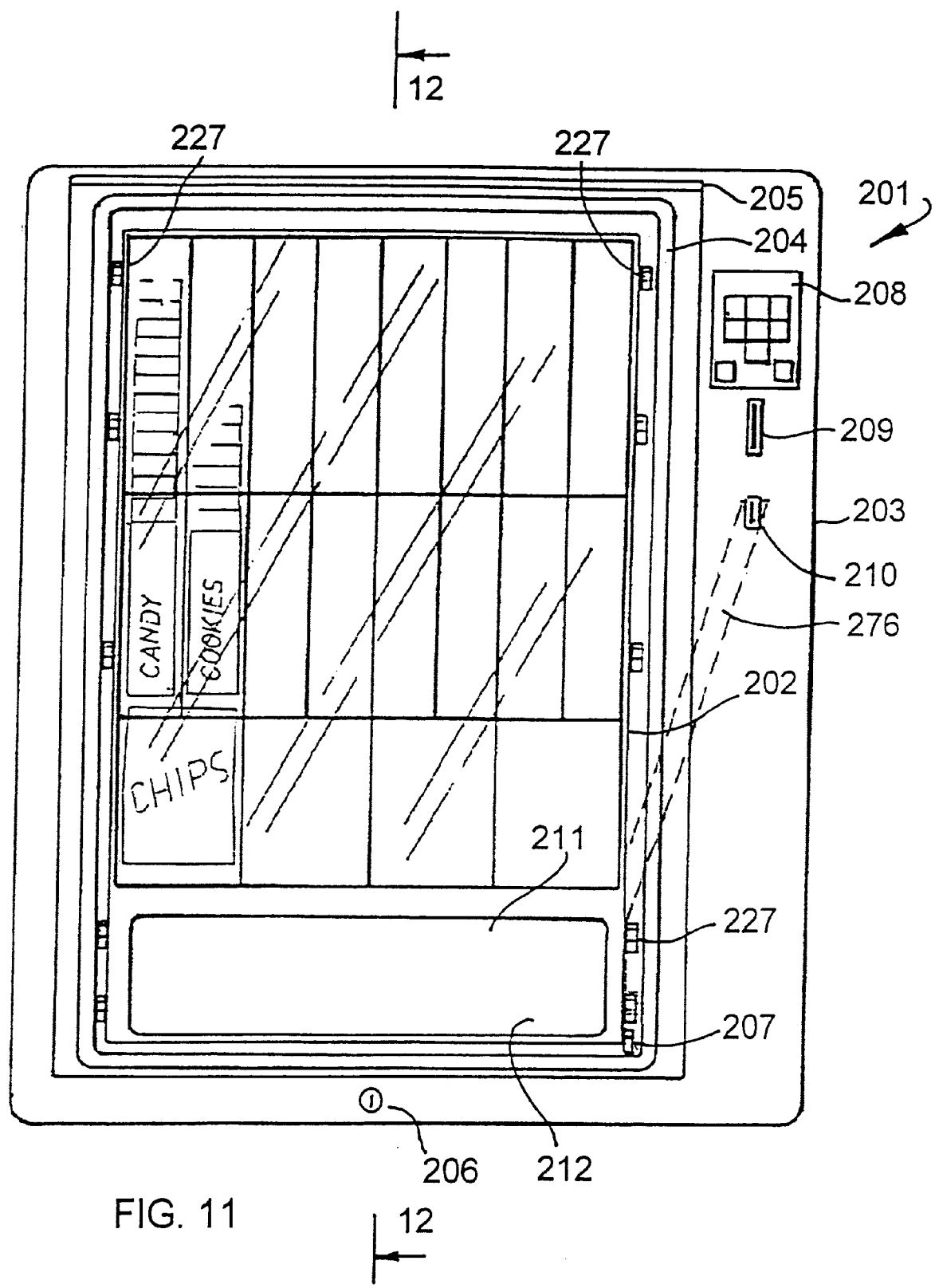
FIG. 11 is a front elevational view of a first alternate embodiment of the vending machine according to the invention.

As illustrated in FIG. 10, a scrolling display 131 is preferably incorporated into the door 132 of an auxiliary vending machine unit 133 that dispenses only beverages. Such a machine is disclosed below and illustrated in FIG. 51. The beverage-dispensing machine does not require a transparent door to view the various available items. The type of available beverages can be indicated on a picture sign 134 located near the distribution pocket 135.

The selection of the beverage and payment therefor is done on the control panel 136 and by using the card slot 137 located on principal machine 138. A simple umbilical cable 139 connects the two machines. A wide variety of enticing messages can be carried on the scroll 140 of the display. The messages on the scroll are exposed for several seconds per frame in a continuous mode of operation. Some messages may tout special packages combining a food item from the principal machine with a drink from the auxiliary machine at a reduced price. The display can also be programmed to match the message with the time of the day. Sandwiches and puddings may be emphasized around lunch or dinner time while candies and cookies are promoted during coffee breaks. The operation of the scrolling display is controlled by the microprocessor 66 operating under well-known programming routines. Entry of program commands can be made through the card reader 8 or via the modem 71.

In this embodiment of the invention, the principal machine 138 has a transparent door 141 that is hinged to the main enclosure 142. The magazine 143 has a scrolling tambour door 144 that securely closes upon any attempt to unlock the door 141, and automatically opens once the magazine is safely installed into the machine and the transparent door 141 has been locked. The tambour mechanism is substantially similar to the one used in the scrolling display, except that the scroll is constituted by a transversally rigid curtain such as the one used in connection with conventional roll-top desks.

An alternate embodiment 201 of the invention illustrated in FIGS. 11–18 also features a merchandise and currency cartridge 202 which is removable from the enclosure cabinet 203. The cabinet, preferably made of molded plastic, includes a transparent front door 204 secured to the cabinet by a top horizontal hinge 205 and a bottom lock 206. The cartridge 202 is mounted on a pair of slides 207 secured to the lower section of the cabinet.

With the transparent door 204 open, the magazine can be pulled out and lifted from its supporting slides.

On a front right section of the cabinet is a keypad 208 upon which the user can dial his selection, a card slot 209 for accepting payment by bank card or enter and down-load data on a so-called "smart card", and a coin slot 210 for accepting cash payments. A large opening 211 in the lower section of the door leads to a dispensing pocket 212 into which purchased items are dropped. In the lower back section of the cabinet is a refrigerating unit comprising a compressor 213 and a condenser 214. Attached to a backboard 215 is a electronic module 216 and a series of motor assemblies 217. A light 219 mounted in the door 24 illuminates the entire machine. The cartridge comprises three or more merchandise-holding trays 219, 220 and 221, and a triangle-shaped currency receptacle 222. The currency receptacle forms the base of the cartridge and its lower lateral ledges rest upon the slides 207. The trays are stacked upon one another and upon the slanted top of the currency receptacle. The trays have downwardly slanted floors and tapering front faces 224 which are vertically aligned exposing a marginal front section of their underside which forms the dispensing openings 225 for the stored merchandise. The trays have approximately the same width. Accordingly, and due to their slanted orientation, a back section 226 of each tray's underside is also exposed. A cover 223 is used to seal the upper tray 219. The cover, the trays and the currency receptacle are secured together by screws engaged in sets of lugs 227 along their respective lateral edges.

Figure 30:
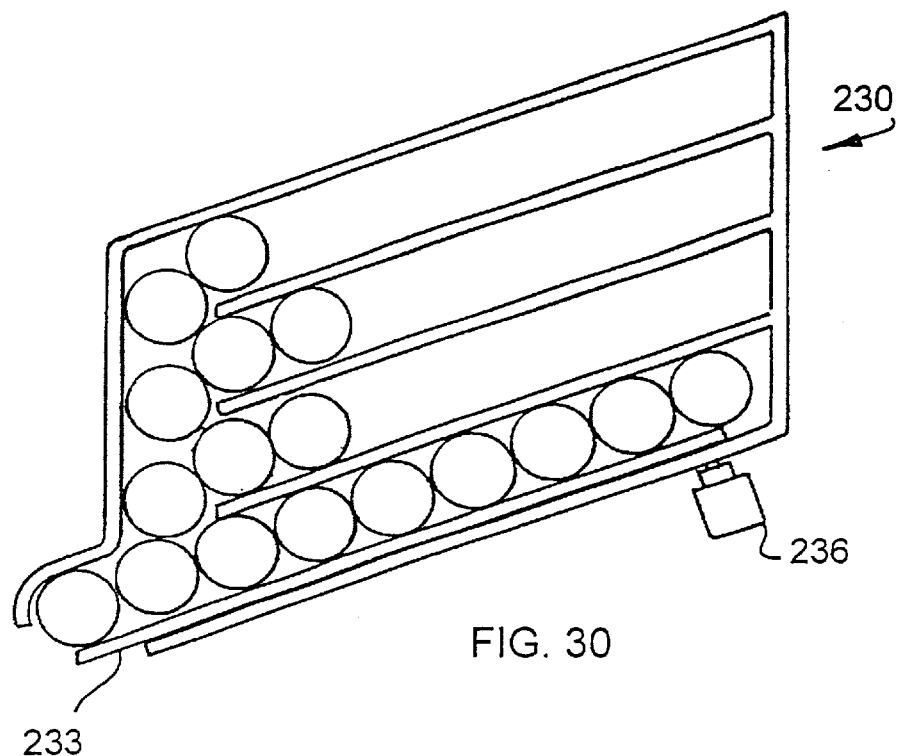
FIG. 30 is a cross-sectional view of an alternate beverage can distributing cartridge.
Figure 29:
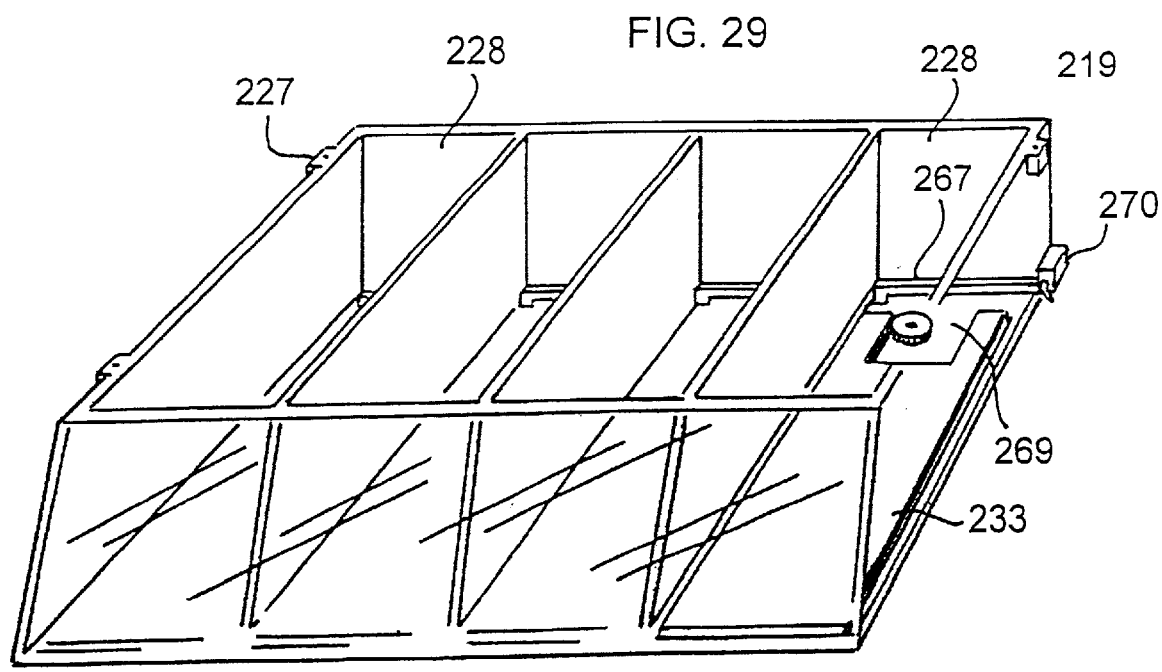
FIG. 29 is a perspective view of a cartridge tray.

A cartridge may combine trays configured to hold different types and sizes of merchandise. For the sake of illustation, the preferred embodiment is shown having a top tray 219 configured to hold small items such as candy bars and cookie packages. The intermediary tray 220 is configured to hold bags of snack foods such as chips or pretzels. The bottom tray 221 is configured to hold standard beverage cans. Each tray is divided into four or eight rows, each row is equipped with its own dispensing mechanism. Typically, a 60 centimeters (24 inches) wide cartridge can accommodate four rows of beverage cans or snack food packages, and eight rows of candies or cookies. Each row in the beverage can holding tray 221 comprises two layers of cans fed to the same dispensing gate. It should be noted that the number of layers of cans can be increased as shown in FIG. 30, and that an entire cartridge devoted uniquely to beverages could comprise a single tray divided into four rows. As shown in FIG. 13, a row initially configured for large snack food bags, can be modified by addition of an insert 231 to accommodate smaller items 232.

A sliding gate member 233 lining the bottom of each row has a front section that closes the dispensing opening 225. At the opposite end of the gate member, a toothed rack 234 is engaged by a pinion or gear 235 driven by an external electrical motor 236. A gang of motors, one for each row, is mounted on the motor assembly 217 secured to the backboard 215. Accordingly, each tray requires a motor assembly board. If the tray configuration within the cartridge is changed, the arrangement of the motor assembly in the back of the cabinet must be reconfigured accordingly. As shown on FIG. 28, when a cartridge is pushed into place in the cabinet, a flat key element 237 mounted at the end of the shaft 238 which drives the pinion 235 engages into a slot 239 cut into a head 240 capping the motor shaft 241. The motor can then be energized to drive the gear in either direction to open or close the dispensing opening 225.

As will be explained below, when the cartridge is being transported, all the dispensing openings are closed. Accordingly, the keys 237 can be oriented to always face the slot 239 in the motor shaft head 240.

In each tray, the goods are laid against the back of the front face 224 and are kept in this position by a triangular pushing block 242 inserted against the back face of the last item in a row. As the goods are dispensed one by one, the blocks keep sliding along with the remaining goods toward the front face 224 and the dispensing opening 225.

The pushing block is not necessary in connection with smoothly or roundly-shaped good which can slide toward the dispensing gate in the absence of any applied downward force other than gravity.

To make certain that no more than one item is dispensed with every movement of the gate member 233, a barrier 243 rises between the item being dispensed and the one next in line in synchronization with the backward movement of the sliding gate member 233. The barrier passes through a quadrangular window 245 cut into the forward end section of the sliding gate member 233.

In the beverage can tray 221, the barrier is constituted by a nylon plate 246 creased along three parallel lines to form three hinges 247, 248 and 249 articulating two rising panels 250 and 251 forming the barrier 243. The forward end 252 of the barrier is secured into the forward end of the window 245. The back end 253 is connected to a trapezoidal nylon pushbar 254 running within a similarly-shaped channel 255 along the length of the gating member 233. The back end of the pushbar is shaped into a toothed rack 255 which also engages the pinion or gear 235 in a diametrically opposed position to the rack 234 of the gate member itself. Accordingly, it be understood that when the gate member 233 is withdrawn toward the back of the tray to open the dispensing opening 225, the pushbar 254 moves in the opposite direction to cause the barrier to rise.

As illustrated in FIG. 20, in order to prevent the heavy weight of the cans 256 from bearing upon the gate member 233 and impeding its movement, the gate member is nested in a depression 257 in the center of the channel floor 258. The edges of the can thus ride on the remaining shoulders 259 on the lateral edges of the channel.

The second alternate embodiment 260 of a snack food distributing machine illustrated in FIGS. 21–24, is basically similar to the first embodiment 1 illustrated in FIGS. 1–9. However, the transparent front door 4 extends down to cover the good-dispensing pocket 9 and includes the opening 60 through which the goods can be reached. Moreover, the magazine 3 is secured by a guillotine-type cover plate 261. that can be removed through a slot 262 in the roof of the cabinet 2. A pair of notches 263 cut in the right edge of the cover plate are normally engaged by the bolts of two locks 264. The locks can be opened with the use of a special key kept at the central location where magazines are processed. The locks are activated by use of a smart-card. The card carries an identification number including the current date. The machine microprocessor maintains its own calendar. When the identification number and date read from the smart-card matches the ones stored into the microprocessor, the locks are activated. A lost or stolen card can only be used for the remainder of the day without becoming obsolete. The smart-card must be updated daily through special equipment at the central processing location. Each lock 264 comprises two interlocking modules. The first 265A mounted against the outer wall of the magazine 3 next to a cover-plate holding channel 263A. A second module 265B is mounted against the inside wall of the cabinet 2, and interconnects with the first module when the magazine is inserted into the cabinet. Each module includes a spring-biased bolt 266A, 266B that can only be retracted under the pull of a solenoid. The bolts of the first module engage the cover-plate notches 263. The bolts of the second module engage mortises in the edge of the door 4. The cover-plate 261 cannot be removed when the door is opened. The door cannote be opened if the cover-plate is not locked into place on the magazine. The door cannot be locked if there is no magazine in the cabinet. These conditions can be easily implemented by use of contact sensors and simple logic circuits.

In the embodiment of 201 of FIGS. 11–18, in order to lock all the gating members 233 in their most forward position where they close the dispensing openings 225, a locking mechanism is provided in each tray as illustrated in FIGS. 25–27. The locking mechanism comprises a locking bar 267 which runs along the back lower corner of each tray, and has a series of lugs 268 positioned to slide behind the back end of each rack 234 in the locked position. In the unlocked position, the lugs can be moved to fall within the gap 269 left behind the pinion 235. The left end of the bar passes through the tray wall and into a lock 270 mounted against the lower back corner of the left face of the tray. The lock comprises a excentric cam 271 engaged into a circular bore 272 at the end of the bar 267. On the front end of the lock, a lever 273 can be actuated by the service personnel. The back end of the lock comprises a tumbler assembly which is configured and aligned to be engaged by a key 275 permanently secured to the backboard 215 of the cabinet when the cartridge is fully installed into the cabinet. The tumbler assembly 274 prevents the lever 273 from being manipulated if the key 275 is not engaged. Moreover, in order to separate the tumbler assembly from the key, the mechanism must be put in the locked position. It can now be understood that when the cartridge is out of the cabinet all the dispensing openings 225 are closed and the levers 273 cannot be manipulated without the use of a key similar to the one installed into the machine. Once the cartridge is installed into the machine and the locking mechanism has been released by manipulation of the levers 273, the dispensing openings can only be opened by operation of the driving motors 236.

The coins fed into the coin slot 210 are led through a chute to a small aperture in the back of the currency receptacle 222. A sliding gate controlled by the same type of locking mechanism that secures the trays, closes that aperture when the mechanism lever is manipulated to release the cartridge. Accordingly, when the cartridge is out of the magazine, the coin receptacle cannot be accessed through that aperture.

Figure 31:
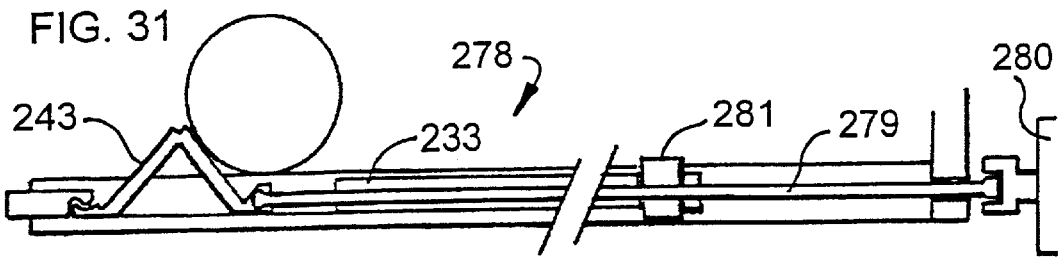
FIG. 31 is a cross-sectional view of an alternative gating plate and barrier drive mechanism.
Figure 32:
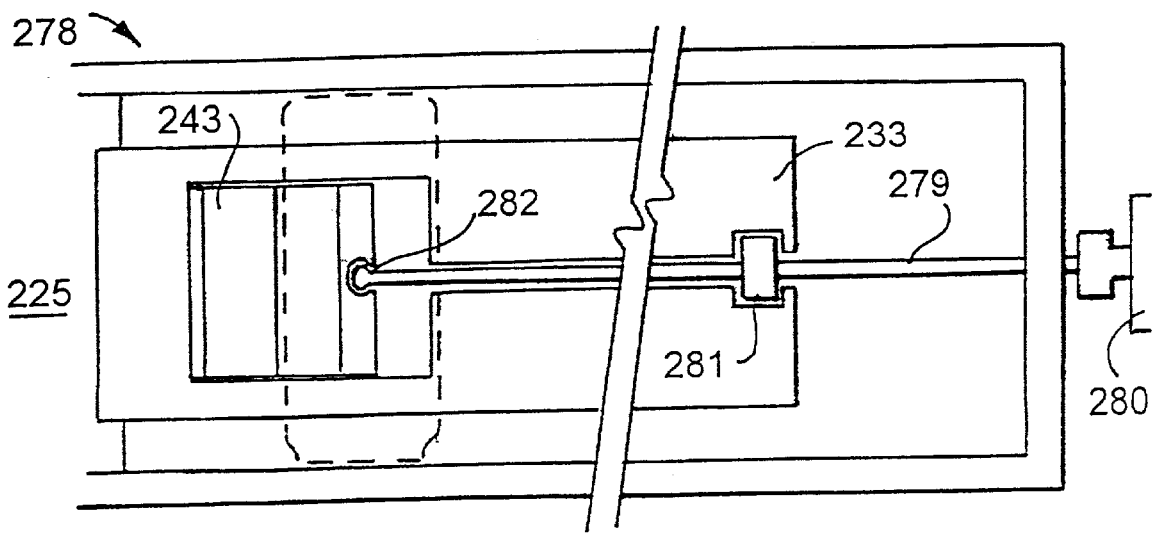
FIG. 32 is a top plan view thereof.

A locked door 277 is provided for emptying the currency receptacle at a service center. An alternate embodiment 278 of the gate member and barrier driving mechanism, is illustrated in FIGS. 31 and 32, relies upon a threaded rod 279 driven by an in-line motor 280 instead of a rack-and-pinion assembly. The rod 279 engages a square nut 281 captured by a cavity in the gate member 233. The distal end 282 of the rod engages a bore in the back edge of the barrier 243. When the motor is turned in one direction, the progress of the rod through the square nut draws the gate member away from the dispensing opening, at the same time pushing against the back side of the barrier.

Figure 33:
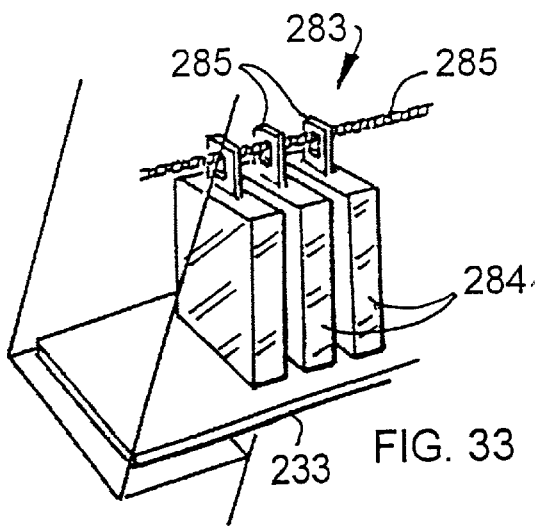
FIG. 33 is a perspective view of an alternate package-feeding mechanism.

In the alternate embodiment of the feeding mechanism illustrated in FIG. 33, the goods are held in separate packs 284 suspended to a rotating threaded rack 285 through pierced tabs 286. The aperture in each tab is axially and slidingly engaged upon the threaded rack 285 so as to move toward the dispensing opening when the rack is rotated. The rack is driven by the same motor that controls the gate member 233. Thus, the goods can be precisely delivered and dropped right above the dispensing opening in synchronization with the movement of the gate member.

Figure 34:
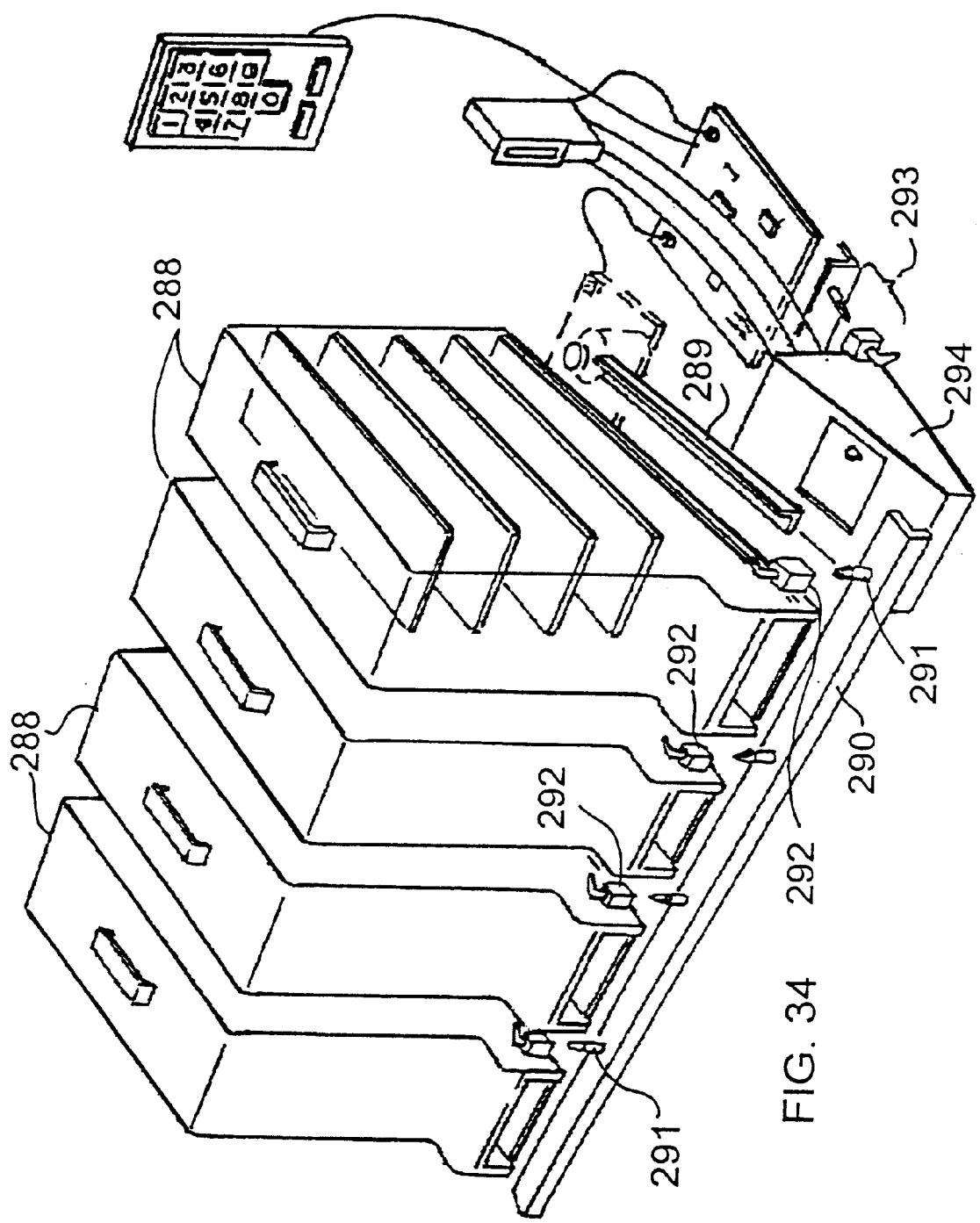
FIG. 34 is an exploded view of a machine dedicated to beverage cans, minus the cabinet.
Figure 41:
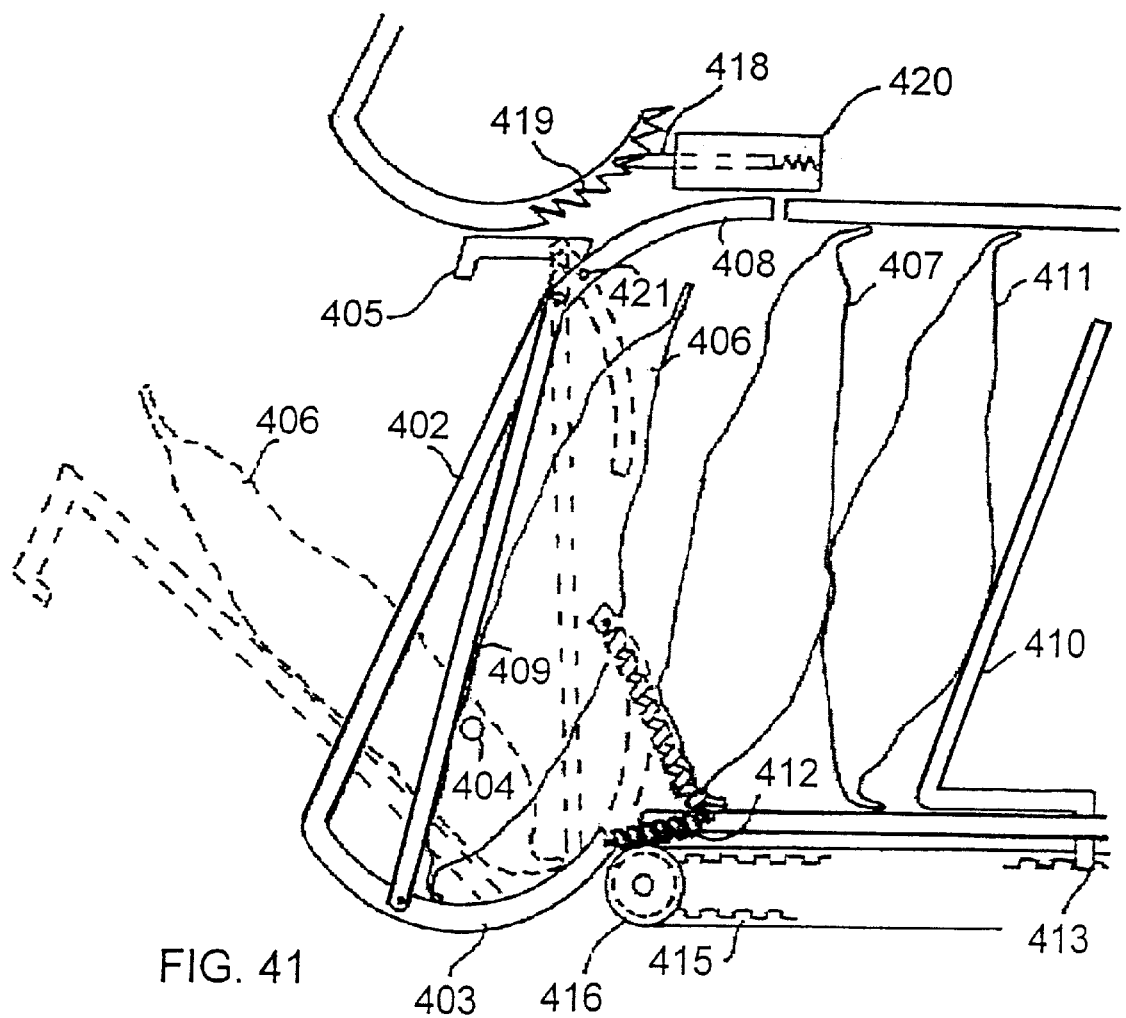
FIG. 41 is a side view of another embodiment of the dispensing mechanism.
Figure 42:
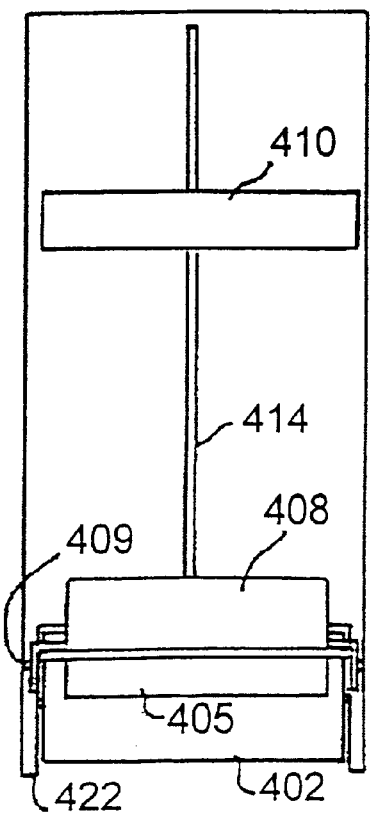
FIG. 42 is a top plan view thereof.
Figure 43:
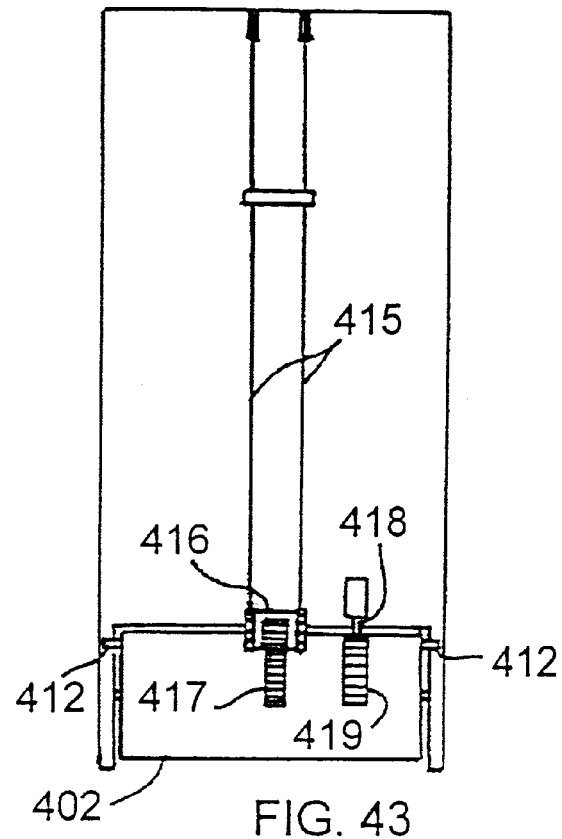
FIG. 43 is a bottom plan view thereof.
Figure 44:
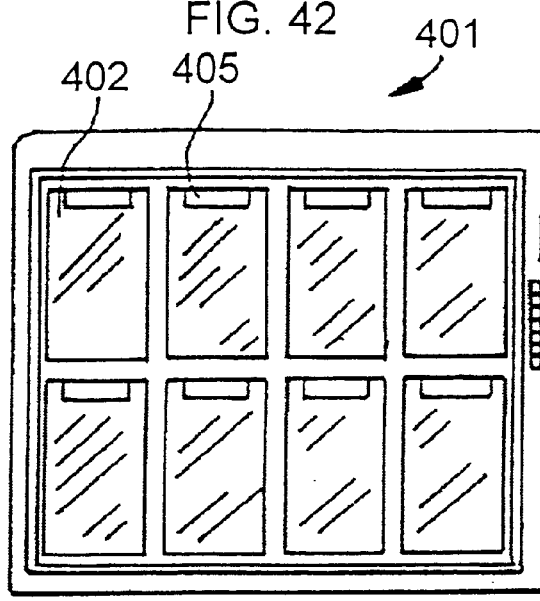
FIG. 44 is a front elevational view of the whole vending machine.
Figure 45:
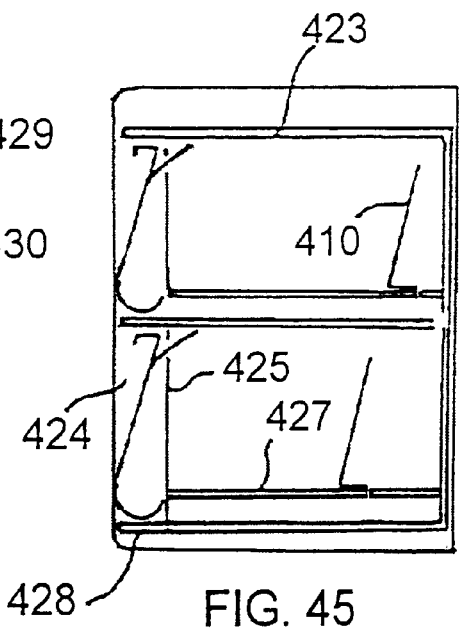
FIG. 45 is a diagrammatical side view of the magazine and enclosure.

The beverage can dispensing machine 287 illustrated in FIGS. 30 and 34 uses a series of side-by-side mounted can cartridges 288 rather than the stacked-up trays of the earlier described embodiment of the invention. Each cartridge has a plurality of rows feeding the single dispensing opening as shown in FIG. 30.

Each cartridge seats on a pair of slated support rails 289 and a front bar 290. The front bar mounts a series of pin keys that cooperate with lock assemblies 292 in the bases of the cartridges to secure the cartridge within the cabinet. A similar locking mechanism 293 is provided for the coin receptacle 294. Loading of the cartridges can be done through the dispensing opening or through a removable panel in either the top, side, or back wall. The slant of the rows in the beverage tray or cartridge is preferably between 10° and 20° from the horizon.

In snack food packages or candy bar rows, the slant is preferably between 20° and 30°.

A 60 cm (24 inches) wide, 75 cm (30 inches) high and 55 cm (22 inches) deep magazine can accommodate approximately 96 candy bars, 32 chip bags and 72 cans.

A 15 cm (6 inches) wide, 60 cm (24 inches) tall and 55 cm (22 inches) deep cartridge can hold 32 cans, for a total machine capacity of 128 cans.

Illustrated in FIGS. 35–40, is an alternate design for the dispensing control which does not rely on gravity to move the items toward the gate. It uses instead, a pushing mechanism synchronized with the gate opening.

In the dispensing mechanism 300 a folding gate 301 is mounted across the dispensing slot 302, and is driven by a backboard-mounted motor 303 by means of a spline and threaded rod assembly. The forward end of the folding gate 301 is secured to a threaded spline 304 having its opposite end engaged in a threaded sleeve 305. The opposite end of the sleeve is fixedly attached to the end of a threaded rod 306 driven by the motor 303. Thus, when the motor is activated the folding gate 301 is withdrawn, forming a barrier between the item 307 first in line to be dispensed and the next one 308 as illustrated in FIG. 37. The items to be dispensed are aligned and pressed against the front face of the dispensing channel by a pusher plate 310 which has a driving mechanism 311 riding in a longitudinal slot 312 in the floor 313 of the channel. This driving mechanism comprises a U-shaped bracket 314 having it ends engaged by the threaded rod 306. Captured between the legs of the bracket are a square nut 315 and a coil spring 316 both also engaged by the treaded rod 306. A spring leaf plate 317 allows the nut to follow the rotational movement of the rod 306 during clockwise rotation of the rod, but causes the nut to progress toward the distal end of the rod opposite the motor 303 when the motor direction is reversed to close the dispensing gate 301. This movement of the square nut 315 apply pressure through the spring 316 against the distal end of the bracket 314 causing the pusher plate 310 to shift the items toward the dispensing slot as illustrated in FIG. 37. The coil spring 316 against which the nut pushes, is provided to accommodate small differences in the sizes of the items and to avoid crunching goods such as potato chips under the action of the pusher plate 310. Accordingly, the pushing movements occurs only after one item has been dispensed and the next in line must be positioned over the folding gate 301.

It should be noted that by changing the position of the hinge on the folding gate and barrier, items of a different thickness can be quickly accommodated. Alternately, a transparent insert can be applied against the back side of the front face to reduce the width of the dispensing slot. Since the folding gate has a very light duty cycle and is not subject to any particular stress, it can conveniently be implemented with a nylon or other synthetic sheet of material that has been appropriately creased to form the hinge. The attachment of the gate elements to the spline and to the floor of the channel can be accomplished by simple snapping nib-and-cavity mechanisms. Accordingly, the gate barrier can be quickly replaced for adjustment to a new height and size or to replace it in case of excessive wear. Since the customer cannot reach the dispensing slot, it is not necessary that the folding gate span the full width of the dispensing slot. Closing the central third of the slot may be sufficient. All the moving components of the system can conveniently be made out of nylon or similar self-lubricating and rust-proof material.

In another alternate embodiment 401 of the vending machine illustrated in FIGS. 41–45, the driving power for the good-dispensing mechanism is provided by the user's opening of one of the pocket-doors 402 at the front of each good-holding station.

Each pocket-door as a inwardly curved bottom section 403 forming a trough which holds the item to be dispensed. The pocket-door is rotatively held by lateral bearings 404 about the horizontal axis of the curved section 403. When the pocket-door is pulled open by way of the handle 405, the tail-end of the curved section rises between the item 406 in the pocket and the next one 407 in line to be dispensed as shown in dotted line in FIG. 41. At the same time, a barrier flap 408 actioned by a lever 409 coupled to the curved section 403 rotates downwardly. The barrier flap combines with the curved section 403 of the pocket-door to prevent access to the good remaining in the station.

A push-plate 410 behind the last item 411 in the station is advanced toward the pocket-door with every closing movement of the latter. The pocket-door is biased toward the closed position by a pair of springs 412. The push-plate has a nib 413 which projects downwardly through a slot 414 in the floor of the station, and is secured to a pair of continuous driving belts 415. The belts are driven by a ratchet gear mechanism 416 coupled to a toothed part 417 in the undersurface of the curved section 403 of the pocket-door.

The pocket-door is locked shut by a solenoid-controlled bolt 418 engaging a second toothed section 419 also in the bottom surface of the pocket-door. When the solenoid is deenergized, the bolt 418 is pushed toward the pocket-door by a coil spring 420, and into engagement with the second tooth section 419; thus, preventing the door from being opened.

In order to accommodate variations in the thickness of the items, the driving belt 416 is preferably given a certain amount of elasticity. Alternately, some resilient slippage may be allowed between the belt and the nib 413 of the push-plate. If the station floor is slanted downward toward the pocket-door, as was taught in connection with some of the earlier described embodiments of the machine, the push-plate and its driving mechanism may not be necessary.

The pivot-pins 421 for the barrier flap and the pocketdoor bearing 403 are secured to the front frame 422 of the station.

The removable and substitutable magazine 423 comprises the stations and their pocket-doors. The magazine front 424 which consists essentiallly of the pocket-doors and their mechanism is detachable along a line 425 from the rest of the magazine to allow serving and reloading at the supply center.

The currency receptacle 426 is located between the floor 427 of the lowest most station and the floor 428 of the magazine. The card reader 429 and the key pad 430 are mounted on the side of the machine enclosure.

Yet another embodiment of a dispensing gate mechanism 431 is illustrated in FIGS. 46–48. This mechanism is particularly adapted for dispensing irregularly shaped articles such as bags of chips, and packages of cookies and gum. It could also be used for dispensing beverage cans. The moving gate 432 is arcuate and forms a trough having a quarter-round bottom 433. The gate is rotatably suspended on each side by a pair of pins 434 mounted on a pair of brackets 435. The bases of the brackets are secured to the lateral edges of a plate 436 that forms the bottom of a goods-holding channel. The plate slides in its longitudinal direction under the action of a rotating cam 437 activated by a motor 438. A pair of arms 439 projecting vertically from the top of the lateral walls of the arcuate gate 432 come in contact with two stationary posts 440 and 441 mounted astride the arm. When contacting either one of the two posts, the arms 439 act as levers that cause the gate to swing around its supporting pins 434 about an axis perpendicular to the downward slant of the plate 436. As illustrated in FIG. 47, when under the action of the cam 437, the plate 436 is fully withdrawn, the gate 432 swings inwardly, opening the dispensing slot 442. It should be noted that the width of the dispensing slot is the sum of the quarter-round chord of the gate plus the amount of translation of the plate 436. Accordingly, a gate having a radius of 2.5 centimeters (1 inch) when combined with a plate movement of 1.25 centimeters (0.5 inch) can yield a total dispensing slot opening of about 5 centimeters (2 inches). It should also be noted that the trailing edge 443 of the arcuate gate rises above the forward edge of the floor plate 436 to form a barrier that prevents the movement of the item next in line to be dispensed toward the dispensing slot 442. When the plate 436 is slid forward, the arcuate gate assumes the closed position illustrated in dotted line in FIG. 47 wherein the trailing edge 443 of the gate meets the forward edge of the floor plate. As more particularly shown in FIG. 46, the interface between the back section 443 and the gate and the forward edge of the plate 436 form a series of intermeshing crenels 444, and 445. This configuration prevents pinching the bottom of some of the items to be dispensed between the gate and the plate.

Figure 49:
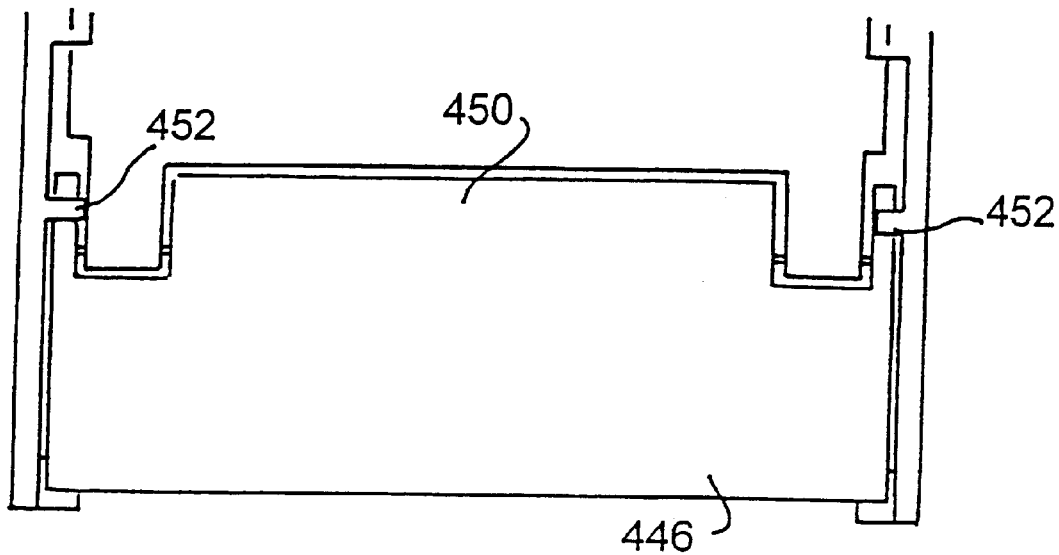
FIG. 49 is a top plan view of yet another dispensing gate mechanism.
Figure 50:
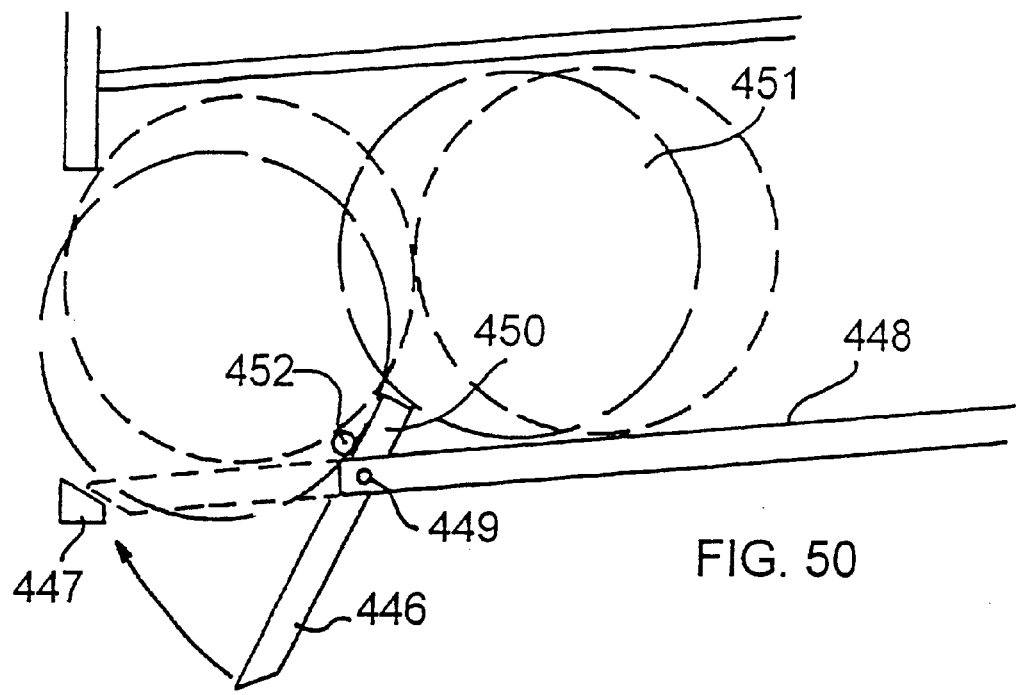
FIG. 50 is a side view thereof.
Figure 54:
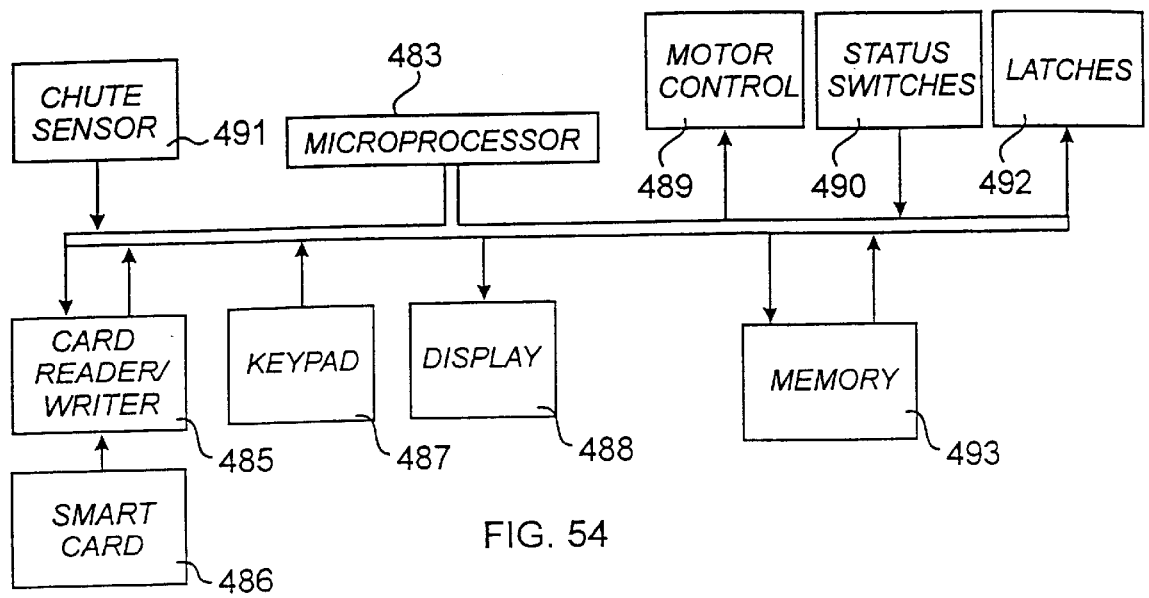
FIG. 54 is a block diagram of the vending machine electronic control.
Figure 55:
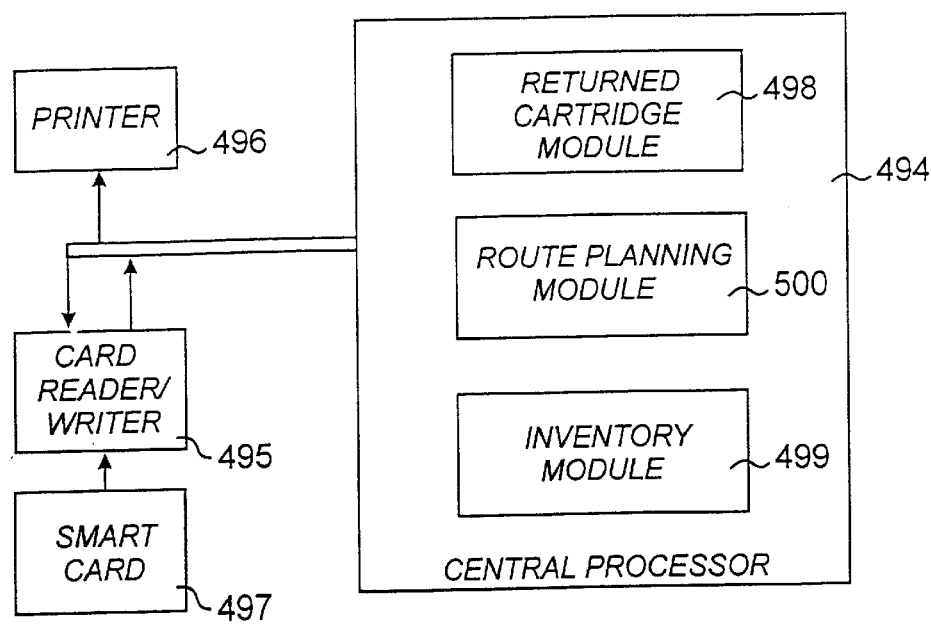
FIG. 55 is a block diagram of the central processing facility's data processing system.

Another embodiment of the dispensing gate particularly adapted for dispensing beverage cans is illustrated in FIGS. 49 and 50. In this case, the gate is formed by a trapdoor 446 that drops under its own weight away from a resting stop 447 when the sliding plate 448 is withdrawn by as little as 0.625 centimeters (0.24 inch). The trapdoor gate is hinged to the end of the sliding plate 448 by a pin 449 located approximately 1.25 centimeter (1.5 inch) from the rear edge of the trapdoor gate 446. Accordingly, the back end 450 of the gate forms a barrier to prevent the passage of the next to be dispensed can 451 when the gate is down. A pair of posts 452 fixedly secured to the lateral wall of the good-holding channel come in contact with the upper surface of the rear section of the gate 450 when the sliding plate 448 is moved forward, causing the dispensing gate to rotate upwardly and close the dispensing slot.

Another convenient embodiment of a beverage can dispensing machine is illustrated in FIGS. 51–53. In this embodiment, the cabinet 444 and the principal magazine 455 are basically similar to those in the embodiment described in FIG. 12. The front door 456 of the cabinet is hinged at its base 457 rather than its top edge in order to provide the space necessary to mount the auxiliary magazine 458 on top of the principal magazine 455. In this embodiment, the principal magazine has a capacity of 16 cans. It includes a coin receptacle 459, and a dispensing gate 460 driven by a cam and motor mechanism 461 of the type illustrated in FIGS. 47 and 48. The principal magazine is not supported by slides but is installed by first placing the front lower corner on a tilting angled bar 462 with the front of the magazine in a horizontal position, then tilting the magazine upwardly in the direction indicated by arrow 463 until the back end of the moving plate 464 comes in contact with the cam and motor mechanism 461. The cans rolls along three levels of slides tilted at approximately 5 degrees from the horizontal. The magazine is loaded from a slot opening 465 on its top which is closed by a sliding gate as will be explained below. The principal magazine 455 can be either completely refilled or simply topped from a portable auxiliary magazine 458. Accordingly, the service person has the option of either removing the principal magazine and replacing it by a fully loaded one, or use the portable auxiliary magazine 458 to add as many cans as may be necessary to top the principal magazine. The auxiliary magazine 458 has a bottom geometry which is designed to intimately mate with the geometry of the principal auxiliary magazine top. Furthermore, the dispensing gate 466 in the bottom of the auxiliary magazine can only be opened when the two magazines are completely mated. Both the filling opening 465 of the principal magazine and the dispensing slot 466 of the auxiliary magazine are controlled by sliding gates which are activated by similar and mating mechanisms 467 and 468 more specifically illustrated in FIGS. 52 and 53. Each sliding plate 469 has a pair of longitudinal slots 470 and 471 near its front edge 472. A first slot 470 is engaged by a lock 473 which is mounted by an angled bracket 474 against the front face of the corresponding magazine. The angled bracket is not attached to the body of the lock but to the shaft that normally mounts the bolt. An enlarged area 475 in the forward end of the first slot is shaped and dimensioned to be engaged by the rotating main body of the lock 476, the lock is oriented such that when the key 477 is removed, the main body of the lock 476 is locked in the position illustrated in FIG. 53. Thus, preventing any movement of the gate 479. The second slot 478 is shaped and dimensioned to pass the key 477 of the other magazine lock. That key is also mounted by a bracket 479 against the front face of the magazine. It can be now understood that in order to free the sliding gate 479 of either magazine, both magazines must be intimately mated with the keys 477 properly engaged into the respective locks. At this point, the main bodies 476 of each lock can be rotated as indicated by a row 480 to allow the sliding gates 469 to be pulled out and open the feeding and dispensing slots 465 and 466 of the respective magazines. A handle 481 associated with each lock body is provided to facilitate the rotation. The auxiliary magazine 458 can be reloaded in a service center by opening a lock-secured top lid 482.

It should be noted that the service personnel can never get access to the goods held by either one of the two magazines.

In addition to or in lieu of currency, the machine accepts payment by so-called "smart cards". A smart card is a type of debit card which mounts a microchip having the capability of holding a file to which data can be added or substracted. Typically, a smart card can be purchased for a fixed price plus a small service charge. The fixed price corresponds to the amount of money stored in the microchip. Machines adapted to accept payment with such a card have the ability of deducting, from the microchip file, the amount corresponding to the purchase. This type of smart card and associated hardware and software technology are commercially available from Cardlogix of Irvine, Calif. Accordingly, the vending machine is equipped with a microprocessor 483 whose data bus 484 is connected to a variety of peripheral devices including a smart card reader/writer 485 having the capability to read and write on smart cards 486 used by customers and smart cards used by service persons to track the machine performance and inventory. The microprocessor bus is also connected to a keypad 487 upon which the customer can dial his choice of goods, and the service person can enter certain information and instructions. The bus also accesses an alpha numerical display 488 used to communicate visual messages to the customers such as machine operating instructions and the like. Once a customer has made his selection, commands are transferred to a motor control 489 that selects and activates the motor corresponding to the channel into which the selected goods are stored. The position of a variety of status switches 490 can be read by the processor through the data bus in order to verify the proper operation of the machine. An optical sensor 491 located at the entrance of the dispensing slot gives an indication that the selected goods has been dropped into the dispensing pocket. The microprocessor can also release certain latches 492 which enable or disable certain operations of the machine in accordance to certain conditions reflected by the status switches 490. For instance, the machine will not attempt to dispense goods if the magazine is not properly inserted into the machine and the front door closed. A solid state memory or equivalent recording medium 493 is used to hold the microprocessor operating an application software as well as the inventory information. The microprocessor can monitor all the sales and maintain a detailed inventory in memory. Prior to servicing a machine, a service person introduces a smart card into the card reader and dials a code on the keypad instructing the microprocessor to transfer the inventory data from the solid state memory 483 onto the service person's smart card. The smart card may also contain program instructions that are read and executed by the microprocessor. Those instructions may include price changes or special promotional command to he scrolling display. The smart card, as well as the removed or partially empty magazine, can be turned in at the service center for processing, and refiling and restocking. The service center is equipped with a central processor 494 which is also provided with a smart card reader/writer 495 and a printer 496. The information read off the service person's smart card 497 is used to verify the returned cartridge contents is consistent with the quantities and types of goods dispersed by the machines, and to generate a complete inventory of the remaining goods held in various vending machines throughout the serviced territory, as well as a schedule of services to be performed during the next day in accordance with the status, that is, the amount of goods still held by the machine previously serviced. Accordingly, the central processor 494 includes a return cartridge software module 498, a inventory control module 499 and a route planning module 500. It should be understood that the central processor can also accumulate statistical data about the entire operation.

The smart cards and readers can be advantageously replaced by other recording devices and communication interfaces including palm-held processors using "blue tooth" interfaces, or by direct link through the Internet according to technologies well-known to people in the data processing arts.

Figure 56:
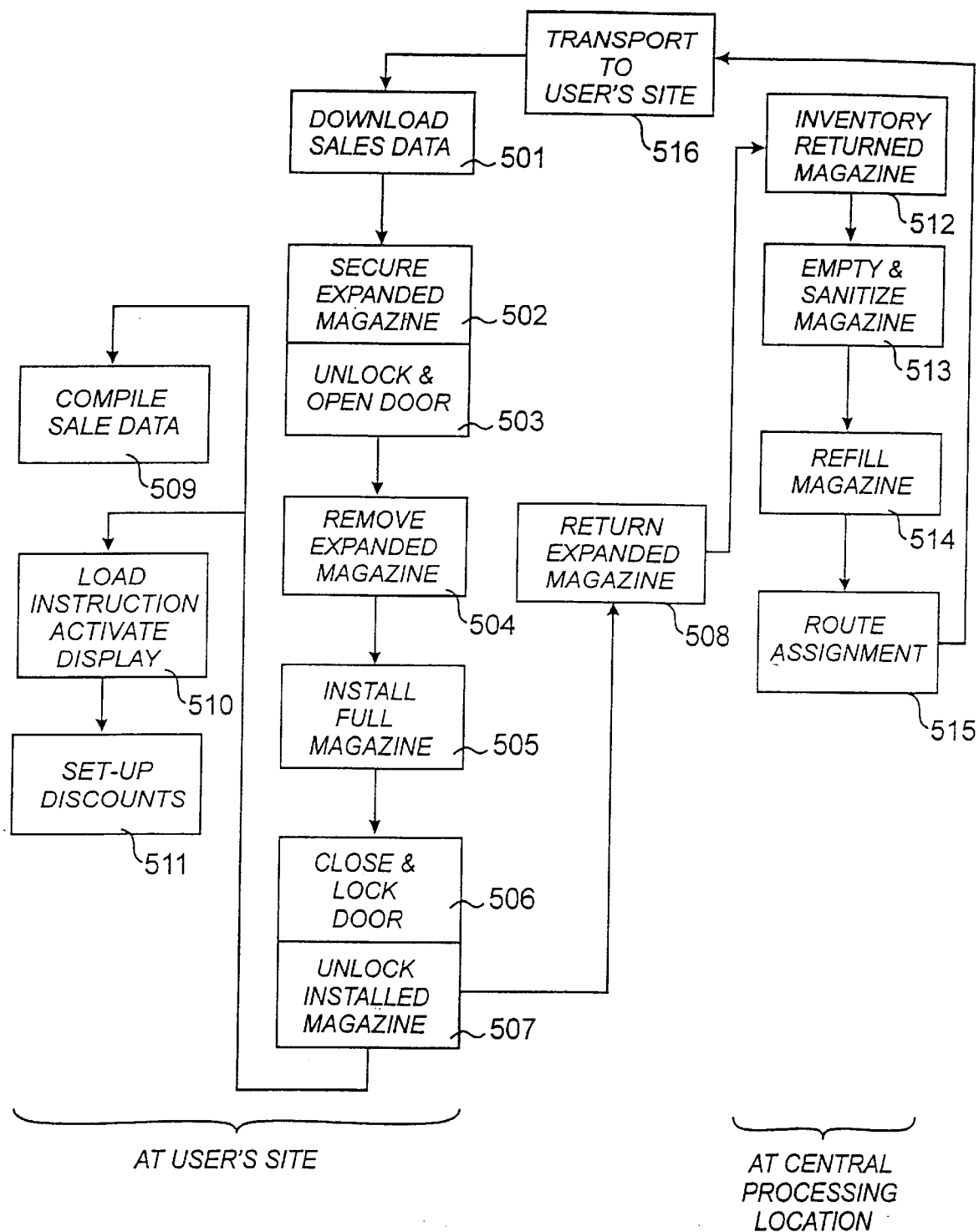
FIG. 56 is a block diagram of a magazine processing.

The block diagram of FIG. 56 illustrates the processing of a magazine at both the user's site and at the central processing location.

Upon arrival at a user's site, the service person may download 501 the sale data accumulated by the vending machine processor. The downloading can be made on a smart card, a hand-held storage device or any other convenient recording medium. In the case where the machine is in direct communication with the central perocessing location, this step of downloading may be skipped.

Next, the service person secure 502 the expanded or partially expanded magazine that is inside the machine, and unlock and open 503 the cabinet door. In some versions of the machine, those two steps are accomplished by the sole unlocking of the door. After removing 504 the expanded or previously mounted magazine, a new full magazine is installed 505 into the cabinet. The cabinet door is then closed 506 and the newly installed magazine is unlocked 507. Again, in some versions of the machine, these two last steps are achieved by locking the door.

The expanded magazine is returned 508 to the central processing location. As the machine is used, its microprocessor compiles 509 sales data such as goods sold and payments collected. On command from a remote location or as programmed, the display is activated or advanced 510 and special price discounts are set up 511 and advertised on the display unit.

When the magazine arrives at the central processing location, it and its contents are inventoried 512. The magazine is then emptied, washed and sanitized 513. It is refilled 514 with goods and then assigned 515 to a route for distribution. The filled magazine is transported 516 to a user's site, and the above-described process is repeated.

While the preferred embodiments of the invention have been described, modifications can be made and other embodiments may be devised without departing from the spirit of the invention and the scope of the appended claims

What is claimed is:

1. A method for selling goods from a supply center to employees and customers of a plurality of entities at a number of locations, said method comprising the following steps:

installing at each one of said locations at least one vending machine engineered to dispense a set of said goods out of a removable magazine upon acceptance of a payment;

at said supply center, filling a plurality of said magazines with sets of a diversity of said goods;

establishing routes, each of said routes linking a given number of said locations;

transporting said full magazines to said locations along said routes, and, at each of said locations, mounting one of said magazines in each of said vending machines in place of any other magazine previously mounted therein;

returning each of said previously mounted magazines to said supply center; and servicing said returned magazines;

wherein, for each of said vending machines, said step of mounting one of said magazines essentially consists of:
opening said vending machine;
removing said previously mounted magazine;
inserting said full magazine in place of said previously mounted one; and
securely locking said vending machine;
in the absence of any currency or discrete goods handling or counting at said locations.

2. The method of claim 1, wherein said step of filling comprises:

filling magazines engineered to dispense goods only when said magazines are securely mounted in said machines, and to prevent removal of any of said goods when said magazines are outside said machines without using a secured opening means.

3. The method of claim 1, which further comprises providing each of said entities, for a fee, a plurality of debit cards for distribution to said employees and customers, said debit cards being usable for payments or on said vending machines.

4. The method of claim 1, wherein said step of installing comprises:

using vending machines engineered to accept currency in payment of goods and to securely accumulate said currency into said removable magazines mounted therein; and said servicing comprises removing said accumulated currency from said magazines upon return to said supply center.

5. The method of claim 1, wherein said servicing comprises sanitizing said magazines prior to said refilling with said goods.

6. The method of claim 1, wherein said step of filling said magazines comprises stocking therein a plurality of comestible goods.

7. The method of claim 6, wherein said step of installing comprises installing at a plurality of said locations at least one snack food vending machine, are at least one beverage vending machine.

8. The method of claim 7, which further comprises:

displaying on one of said vending machines a discount price for at least one combination of a snack food item and one beverage item; and programming said machines to deliver said combination upon acceptance of said discount price payment.

9. The method of claim 1 which further comprises:

automatically compiling into each of said machines, a record of good-selling transactions on a readable medium, and reading said record off said medium at said supply center.

10. The method of claim 9, which further comprises compiling said record in said magazines; and said step of servicing comprise reading said record.

11. The method of claim 9, which further comprises downloading said record onto a carryable recording device.

* * * * *